(12) United States Patent
Zhang et al.

(10) Patent No.: US 10,877,161 B2
(45) Date of Patent: Dec. 29, 2020

(54) POSITIONING METHOD IN MOBILE NETWORK, BASE STATION, AND MOBILE TERMINAL

(71) Applicant: HUAWEI TECHNOLOGIES CO., LTD., Shenzhen (CN)

(72) Inventors: Yi Zhang, Beijing (CN); Hui Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 257 days.

(21) Appl. No.: 15/965,832

(22) Filed: Apr. 27, 2018

(65) Prior Publication Data

US 2018/0246220 A1 Aug. 30, 2018

Related U.S. Application Data

(63) Continuation of application No. PCT/CN2016/103799, filed on Oct. 28, 2016.

(30) Foreign Application Priority Data

Oct. 29, 2015 (WO) .............. PCT/CN2015/093278

(51) Int. Cl.
  *G01S 19/43* (2010.01)
  *G01S 19/04* (2010.01)
  *G01S 19/07* (2010.01)

(52) U.S. Cl.
  CPC .............. *G01S 19/43* (2013.01); *G01S 19/04* (2013.01); *G01S 19/071* (2019.08); *G01S 19/073* (2019.08)

(58) Field of Classification Search
  CPC ...... G01S 19/07; G01S 19/071; G01S 19/073; G01S 19/43
  See application file for complete search history.

(56) References Cited

U.S. PATENT DOCUMENTS 6,058,338 A * 5/2000 Agashe .................. G01S 19/07
  701/13
6,100,842 A * 8/2000 Dreier .................. G01S 5/0009
  342/357.41

(Continued)

FOREIGN PATENT DOCUMENTS

CN  1897748 A  1/2007
CN  101483806 A  7/2009

(Continued)

OTHER PUBLICATIONS

N. Brown et al., RTK Rover Performance using the Master-Auxiliary Concept, Journal of Global Positioning Systems, vol. 5(1-2), p. 135-144, 2006 (Year: 2006).*

(Continued)

*Primary Examiner* — Bernarr E Gregory
*Assistant Examiner* — Fred H Mull
(74) *Attorney, Agent, or Firm* — Kilpatrick Townsend & Stockton LLP

(57) ABSTRACT

Embodiments of the present invention provide a positioning method. In those embodiments, the positioning method includes: receiving, by the first base station, an RTK measurement value for an RTK reference source; determining, by the first base station, first correction information according to the RTK measurement value, where the first correction information is correction information for positioning information obtained by the RTK reference source from a positioning system; sending, by the first base station, the first correction information to a first mobile terminal, so that the first mobile terminal determines a location of the first mobile terminal according to the first correction information.

6 Claims, 17 Drawing Sheets

(56) References Cited

U.S. PATENT DOCUMENTS

| | | | |
|---|---|---|---|
| 6,153,172 A | 11/2000 | Schroder | |
| 6,507,738 B1 | 1/2003 | Allison et al. | |
| 2001/0002822 A1* | 6/2001 | Watters | G01S 5/14 342/357.64 |
| 2005/0064878 A1* | 3/2005 | O'Meagher | G01S 5/0063 455/456.1 |
| 2008/0284645 A1 | 11/2008 | Terada et al. | |
| 2013/0293412 A1* | 11/2013 | Appleford | G01S 19/43 342/357.23 |
| 2014/0085139 A1* | 3/2014 | Leandro | G01S 19/03 342/357.37 |
| 2015/0185331 A1 | 7/2015 | Dai et al. | |
| 2018/0003507 A1* | 1/2018 | Arslan | G01C 21/165 |

FOREIGN PATENT DOCUMENTS

| | | |
|---|---|---|
| CN | 101651097 A | 3/2010 |
| CN | 101963497 A | 2/2011 |
| CN | 102739301 B | 10/2012 |
| CN | 102761961 B | 10/2012 |
| CN | 103299205 A | 9/2013 |
| CN | 103364815 A | 10/2013 |
| CN | 104168576 A | 11/2014 |
| CN | 204046584 U | 12/2014 |
| CN | 104333994 A | 8/2015 |
| JP | H0755912 B2 | 6/1995 |
| JP | H0961509 A | 3/1997 |
| WO | 2006046298 A1 | 5/2006 |
| WO | 2009126587 A1 | 10/2009 |
| WO | 2010052496 A1 | 5/2010 |

OTHER PUBLICATIONS

Weber G et al, Networked Transport of RTCM via Internet Protocol (Ntrip)-IP-streaming for real-time GNSS applications, on Sep. 16, 2005, XP002543047, 6 pages.

Enabler Test Specification for SUPL V2.0 Candidate Version 2.0—Aug. 18, 2009, Open Mubiie Aiiiance OMA-ETS-SUPL-V2_0-20090818-C, Open Mobiie Alliance, 137 pages.

* cited by examiner

800

A server receives an RTK measurement value that is for an RTK reference source and sent by a first base station, and the RTK reference source is installed on the first base station ~ S810

The server determines first correction information according to the RTK measurement value, where the first correction information is correction information for positioning information obtained by the RTK reference source from a positioning system ~ S820

The server sends the first correction information to the first base station, so that the first base station forwards the first correction information to a first mobile terminal, so that the first mobile terminal corrects, according to the first correction information, positioning information obtained by the first mobile terminal from the positioning system, so as to determine a location of the first mobile terminal ~ S830

FIG. 11

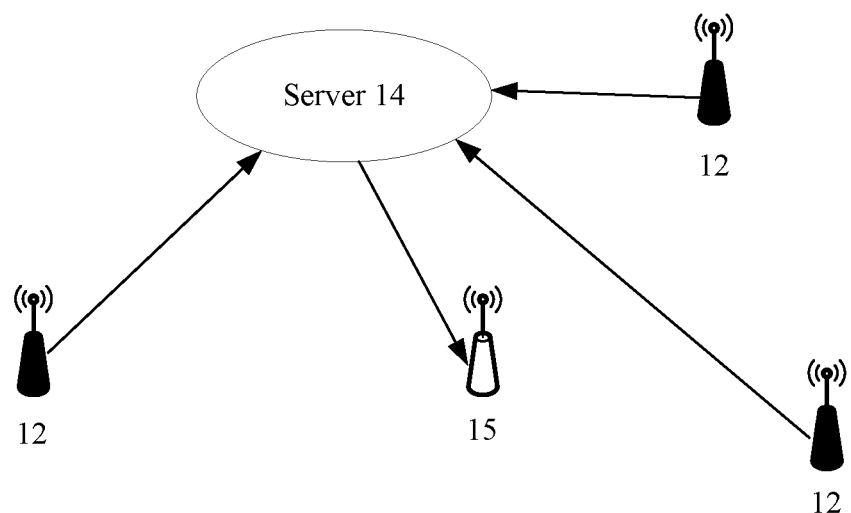

A second base station obtains second correction information, where the second correction information is determined according to an RTK measurement value for an RTK reference source installed on a first base station, and the RTK reference source is not installed on the second base station  — S910

The second base station sends the second correction information to a second mobile terminal, so that the second mobile terminal corrects, according to the second correction information, positioning information obtained by the second mobile terminal from the positioning system, so as to determine a location of the second mobile terminal  — S920

A mobile terminal obtains positioning information for the mobile terminal from a positioning system  — S1100

The mobile terminal receives correction information sent by a base station, where the correction information is determined according to a real-time kinematic measurement value  — S1200

The mobile terminal corrects the positioning information according to the correction information, so as to determine a location of the mobile terminal  — S1300

FIG. 15

POSITIONING METHOD IN MOBILE NETWORK, BASE STATION, AND MOBILE TERMINAL

CROSS-REFERENCE TO RELATED APPLICATIONS

This application is a continuation of International Application No. PCT/CN2016/103799, filed on Oct. 28, 2016, which claims priority to International Application No. PCT/CN2015/093278, filed on Oct. 29, 2015. The disclosures of the aforementioned applications are hereby incorporated by reference in their entireties.

TECHNICAL FIELD

The present invention relates to the communications field, and more specifically, to a positioning method in a mobile network, a base station, and a mobile terminal.

BACKGROUND

In a Long Term Evolution (LTE) system, there are three main standard positioning manners: assisted Global Navigation Satellite System (A-GNSS) positioning, Observed Time Difference of Arrival (OTDOA) positioning, and enhanced Cell ID (e-CID) positioning. However, none of the three positioning manners can meet a requirement for high-precision positioning.

At present, in national surveying and mapping industries, a real-time kinematic (RTK) technology is used to correct GNSS positioning information that uses a carrier phase technology, so as to obtain a more precise positioning result. However, a network RTK positioning technology needs to be implemented based on a continuously operation reference stations (CORS) system, and currently the CORS system is applied to the surveying and mapping field only and is not opened to common users; in addition, the CORS system has a limited broadcast capability, and cannot accommodate a large quantity of common mobile network users.

SUMMARY

Embodiments of the present invention provide a positioning method in a mobile network, a base station, and a mobile terminal, so as to perform high-precision positioning for a mobile terminal.

According to a first aspect, a positioning method in a mobile network is provided, and the positioning method includes: A first base station receives a real-time kinematic RTK measurement value for an RTK reference source; the first base station determines first correction information according to the RTK measurement value, where the first correction information is correction information for positioning information obtained by the RTK reference source from a positioning system; the first base station sends the first correction information to a first mobile terminal, so that the first mobile terminal corrects, according to the first correction information, positioning information obtained by the first mobile terminal from the positioning system, so as to determine a location of the first mobile terminal. In an embodiment, the RTK reference source is installed on the first base station; or the first base station and the RTK reference source are independently installed, but are installed in a same geographical location; or the two are installed side by side.

With reference to the first aspect, in a first implementation of the first aspect, the first correction information includes a single-reference-station differential correction parameter. The first base station determines the single-reference-station differential correction parameter according to the RTK measurement value, where the single-reference-station differential correction parameter is correction information for the positioning information obtained by the RTK reference source from the positioning system. The first base station sends the single-reference-station differential correction parameter to the first mobile terminal, so that the first mobile terminal corrects, according to the first correction information, the positioning information obtained by the first mobile terminal from the positioning system, so as to determine the location of the first mobile terminal.

With reference to the first aspect and the foregoing implementation, in a second implementation of the first aspect, the first correction information includes a single-reference-station differential correction parameter. The first base station sends the RTK measurement value to the server; and the first base station receives the single-reference-station differential correction parameter sent by the server, where the single-reference-station differential correction parameter is determined by the server according to the RTK measurement value. The first base station sends the single-reference-station differential correction parameter to the first mobile terminal, so that the first mobile terminal corrects, according to the first single-reference-station differential correction parameter, the positioning information obtained by the first mobile terminal from the positioning system, so as to determine the location of the first mobile terminal. Therefore, the server determines the correction information of the first base station, thereby reducing workload of the base station.

With reference to the first aspect and the foregoing implementation, in a third implementation of the first aspect, the first base station sends a cell broadcast message, where the cell broadcast message carries the first correction information, so that the first mobile terminal corrects, according to the first correction information, the positioning information obtained by the first mobile terminal from the positioning system, so as to determine the location of the first mobile terminal. In an embodiment, the cell broadcast message includes a first system information block SIB message.

With reference to the first aspect and the foregoing implementation, in a fourth implementation of the first aspect, the positioning method further includes: sending, by the first base station, the RTK measurement value, so that a second base station sends, to a second mobile terminal, second correction information determined according to the RTK measurement value, so that the second mobile terminal corrects, according to the second correction information, positioning information obtained by the second mobile terminal from the positioning system, so as to determine a location of the second mobile terminal. Therefore, the first base station sends the RTK measurement value, and the second base station sends, to the second mobile terminal, the second correction information determined according to the RTK measurement value, so that the second mobile terminal determines high-precision positioning information according to the second correction information, thereby meeting requirements of a large quantity of mobile users for high-precision positioning and reducing construction costs of the first base station. In addition, the method is flexible and convenient, and is easy to implement.

With reference to the first aspect and the foregoing implementation, in a fifth implementation of the first aspect, the first base station sends the RTK measurement value to the second base station by using N forward base stations, so that the second base station sends the second correction information to the second mobile terminal, so that the second mobile terminal corrects, according to the second correction information, the positioning information obtained by the second mobile terminal from the positioning system, so as to determine the location of the second mobile terminal, where N is determined according to a time-to-live value of the RTK measurement value, the RTK reference source is not installed on the forward base stations, and the second correction information is determined by the second base station according to the RTK measurement value. Therefore, the first base station sends the RTK measurement value, and the second base station determines the second correction information according to the RTK measurement value, and sends the second correction information to the second mobile terminal, so that the second mobile terminal determines high-precision positioning information according to the second correction information, thereby meeting requirements of a large quantity of mobile users for high-precision positioning and reducing construction costs of the first base station. In addition, the method is flexible and convenient, and is easy to implement.

With reference to the first aspect and the foregoing implementation, in a sixth implementation of the first aspect, the first base station sends the RTK measurement value to the server, so that the server sends the second correction information to the second base station according to the RTK measurement value, so that the second base station sends the second correction information to the second mobile terminal, so that the second mobile terminal corrects, according to the second correction information, the positioning information obtained by the second mobile terminal from the positioning system, so as to determine the location of the second mobile terminal, where the second correction information is determined by the server according to the RTK measurement value. Therefore, the first base station sends the RTK measurement value, and the server determines the second correction information according to the RTK measurement value, and sends the second correction information to the second base station, and the second base station forwards the second correction information to the second mobile terminal, so that the second mobile terminal determines high-precision positioning information according to the second correction information, thereby meeting requirements of a large quantity of mobile users for high-precision positioning, reducing workload of the base station, and reducing construction costs of the first base station. In addition, the method is flexible and convenient, and is easy to implement.

According to a second aspect, a positioning method in a mobile network is provided, and the positioning method includes: A server receives a real-time kinematic RTK measurement value that is for an RTK reference source and sent by a first base station; the server determines first correction information according to the RTK measurement value, where the first correction information is correction information for positioning information obtained by the RTK reference source from a positioning system; and the server sends the first correction information to the first base station, so that the first base station forwards the first correction information to the first mobile terminal, so that the first mobile terminal corrects, according to the first correction information, positioning information obtained by the first mobile terminal from the positioning system, so as to determine a location of the first mobile terminal. Therefore, the server determines the first correction information according to the RTK measurement value, and forwards the first correction information to the first mobile terminal by using the first base station, so that the mobile terminal obtains high-precision positioning information according to the correction information, thereby meeting requirements of a large quantity of mobile users for high-precision positioning. In addition, the base station is flexible and convenient, and is easy to implement.

With reference to the second aspect, in a first implementation of the second aspect, the first correction information includes a single-reference-station differential correction parameter. The server determines the single-reference-station differential correction parameter according to the RTK measurement value. The server sends the single-reference-station differential correction parameter to the first base station, so that the first base station forwards the single-reference-station differential correction parameter to the first mobile terminal, so that the first mobile terminal corrects, according to the single-reference-station differential correction parameter, the positioning information obtained by the first mobile terminal from the positioning system, so as to determine the location of the first mobile terminal.

With reference to the second aspect and the foregoing implementation, in a second implementation of the second aspect, the positioning method further includes: determining, by the server, second correction information according to the RTK measurement value; and sending, by the server, the second correction information to a second base station, so that the second base station forwards the second correction information to a second mobile terminal, so that the second mobile terminal corrects, according to the second correction information, positioning information obtained by the second mobile terminal from the positioning system, so as to determine a location of the second mobile terminal. Therefore, the server determines the second correction information according to the RTK measurement value, and forwards the second correction information to the second mobile terminal by using the second base station, so that the second mobile terminal obtains high-precision positioning information according to the correction information, thereby meeting requirements of a large quantity of mobile users for high-precision positioning. In addition, the correction information for the first base station and the correction information for the second base station are both determined by the server, which facilitates management and reduces workload of the base stations.

With reference to the second aspect and the foregoing implementation, in a third implementation of the second aspect, the second base station is located in a preset area of the first base station, and the second correction information includes a single-reference-station differential correction parameter. The server sends the single-reference-station differential correction parameter to the second base station, so that the second base station forwards the single-reference-station differential correction parameter to the second mobile terminal, so that the second mobile terminal corrects, according to the single-reference-station differential correction parameter, the positioning information obtained by the second mobile terminal from the positioning system, so as to determine the location of the second mobile terminal.

With reference to the second aspect and the foregoing implementation, in a fourth implementation of the second aspect, the second correction information includes a virtual reference station VRS differential correction parameter. The server determines the VRS differential correction parameter according to at least two RTK measurement values sent by at least two target first base stations, where the at least two target first base stations are first base stations nearest the second base station, and each RTK measurement value is corresponding to one target first base station on which the RTK reference source is installed. The server sends the VRS differential correction parameter to the second base station, so that the second base station forwards the VRS differential correction parameter to the second mobile terminal, so that the second mobile terminal corrects, according to the VRS differential correction parameter, the positioning information obtained by the second mobile terminal from the positioning system, so as to determine the location of the second mobile terminal.

With reference to the second aspect and the foregoing implementation, in a fifth implementation of the second aspect, the second correction information includes a master-auxiliary concept MAC unit differential correction parameter. The server determines the MAC unit differential correction parameter according to at least two RTK measurement values sent by at least two target first base stations, where the at least two target first base stations and the second base station belong to a same target MAC unit, and each RTK measurement value is corresponding to one target first base station on which the RTK reference source is installed. The server sends the MAC unit differential correction parameter to the second base station, so that the second base station forwards the MAC unit differential correction parameter to the second mobile terminal, so that the second mobile terminal corrects, according to the MAC unit differential correction parameter, the positioning information obtained by the second mobile terminal from the positioning system, so as to determine the location of the second mobile terminal.

According to a third aspect, a positioning method in a mobile network is provided, and the positioning method includes: A second base station obtains second correction information, where the second correction information is determined according to a real-time kinematic RTK measurement value for an RTK reference source installed on a first base station, and the RTK reference source is not installed on the second base station; and the second base station sends the second correction information to the second mobile terminal, so that the second mobile terminal corrects, according to the second correction information, positioning information obtained by the second mobile terminal from a positioning system, so as to determine a location of the second mobile terminal.

With reference to the third aspect, in a first implementation of the third aspect, the second base station receives the RTK measurement value sent by the first base station, where the RTK reference source is installed on the first base station; and the second base station determines the second correction information according to the RTK measurement value.

With reference to the third aspect and the foregoing implementation, in a second implementation of the third aspect, the second base station receives the RTK measurement value that is sent by the first base station and forwarded by using N forward base stations, where N is determined according to a time-to-live value of the RTK measurement value, and the RTK reference source is not installed on the forward base stations; and the second base station determines the second correction information according to the RTK measurement value.

With reference to the third aspect and the foregoing implementation, in a third implementation of the third aspect, a distance between the second base station and the first base station falls within a preset range, and the second correction information includes a single-reference-station differential correction parameter. The second base station receives the RTK measurement value sent by the first base station, where the RTK reference source is installed on the first base station; and the second base station determines the single-reference-station differential correction parameter according to the RTK measurement value. The second base station sends the single-reference-station differential correction parameter to the second mobile terminal, so that the second mobile terminal corrects, according to the single-reference-station differential correction parameter, the positioning information obtained by the second mobile terminal from the positioning system, so as to determine the location of the second mobile terminal.

With reference to the third aspect and the foregoing implementation, in a fourth implementation of the third aspect, the second correction information includes a virtual reference station VRS differential correction parameter. The second base station receives at least two RTK measurement values sent by at least two first base stations, where each RTK measurement value is corresponding to one first base station on which the RTK reference source is installed; and the second base station determines the VRS differential correction parameter according to the at least two RTK measurement values sent by the at least two first base stations. The second base station sends the VRS differential correction parameter to the second mobile terminal, so that the second mobile terminal corrects, according to the VRS differential correction parameter, the positioning information obtained by the second mobile terminal from the positioning system, so as to determine the location of the second mobile terminal.

With reference to the third aspect and the foregoing implementation, in a fifth implementation of the third aspect, the second correction information includes a master-auxiliary concept MAC unit differential correction parameter. The second base station receives at least two target RTK measurement values sent by at least two target first base stations, where the second base station and the target first base stations belong to a same target MAC unit, and each RTK measurement value is corresponding to one target first base station on which the RTK reference source is installed; and the second base station determines the MAC unit differential correction parameter according to the at least two target RTK measurement values. The second base station sends the MAC unit differential correction parameter to the second mobile terminal, so that the second mobile terminal corrects, according to the MAC unit differential correction parameter, the positioning information obtained by the second mobile terminal from the positioning system, so as to determine the location of the second mobile terminal.

With reference to the third aspect and the foregoing implementation, in a sixth implementation of the third aspect, the second base station receives the second correction information sent by the server, where the second correction information is determined according to the RTK measurement value that is for the RTK reference source and sent by the first base station.

With reference to the third aspect and the foregoing implementation, in a seventh implementation of the third aspect, the second base station sends a cell broadcast message, where the cell broadcast message carries the second correction information, so that the second mobile terminal corrects, according to the second correction information, the positioning information obtained by the second mobile terminal from the positioning system, so as to determine the location of the second mobile terminal. In an embodiment, the cell broadcast message includes a second system information block SIB message.

According to a fourth aspect, a positioning method in a mobile network is provided, and the positioning method includes: A mobile terminal obtains positioning information for the mobile terminal from a positioning system; the mobile terminal receives correction information sent by a base station, where the correction information is determined according to a real-time kinematic RTK measurement value; and the mobile terminal corrects the positioning information according to the correction information, so as to determine a location of the mobile terminal.

According to a fifth aspect, a base station is provided, and the base station includes a receiving module, a processing module, and a sending module. The receiving module, the processing module, and the sending module are configured to execute a method in the first aspect and the first five implementations of the first aspect.

According to a sixth aspect, a base station is provided, and the base station includes a receiving module and a sending module. The receiving module and the sending module are configured to execute a method in the sixth implementation of the first aspect.

According to a seventh aspect, a server is provided, and the server includes a receiving module, a processing module, and a sending module. The receiving module, the processing module, and the sending module are configured to execute the method in the third aspect.

According to an eighth aspect, a mobile terminal is provided, and the mobile terminal includes an obtaining module, a receiving module, and a processing module. The obtaining module, the receiving module, and the processing module are configured to execute the method in the second aspect.

According to an eighth aspect, a base station is provided, and the base station includes a receiver, a transmitter, a memory, a processor, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal. The processor, the receiver, and the transmitter are specifically configured to execute a method in the first aspect and the first five implementations of the first aspect.

According to a ninth aspect, a base station is provided, and the base station includes a receiver, a transmitter, a memory, a processor, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal. The processor, the receiver, and the transmitter are specifically configured to execute a method in the sixth implementation of the first aspect.

According to a tenth aspect, a server is provided, and the server includes a receiver, a transmitter, a memory, a processor, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal. The processor, the receiver, and the transmitter are specifically configured to execute the method in the second aspect.

According to an eleventh aspect, a base station is provided, and the base station includes a receiver, a transmitter, a memory, a processor, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal. The processor, the receiver, and the transmitter are specifically configured to execute the method in the third aspect.

According to a twelfth aspect, a mobile terminal is provided, and the mobile terminal includes a receiver, a transmitter, a memory, a processor, and a bus system. The receiver, the transmitter, the processor, and the memory are connected by using the bus system. The memory is configured to store an instruction. The processor is configured to execute the instruction stored in the memory, to control the receiver to receive a signal and control the transmitter to send a signal. The processor, the receiver, and the transmitter are specifically configured to execute the method in the fourth aspect.

According to the positioning method in a mobile network, the base station, and the mobile terminal in the embodiments of the present invention, the RTK reference source is disposed on a base station side, the correction information is determined according to the RTK measurement value, and the correction information is sent to the mobile terminal, so that the mobile terminal corrects, according to the correction information, the positioning information obtained by the mobile terminal from the positioning system, so as to determine high-precision positioning information for the mobile terminal, thereby meeting requirements of a large quantity of mobile users for high-precision positioning.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 11 is a schematic flowchart of a positioning method in a mobile network according to another embodiment of the present invention;

FIG. 12 is a schematic diagram of a positioning method in a mobile network according to another embodiment of the present invention;

FIG. 14 is a schematic flowchart of a positioning method in a mobile network according to still another embodiment of the present invention;

FIG. 15 is a schematic flowchart of a positioning method in a mobile network according to yet another embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems, such as: a Global System for Mobile Communications (GSM"), a Code Division Multiple Access (CDMA) system, a Wideband Code Division Multiple Access (WCDMA) system, a general packet radio service (GPRS) system, and a Long Term Evolution (LTE) system.

User equipment (UE), also referred to as a mobile terminal (Mobile Terminal), mobile user equipment, and the like, may communicate with one or more core networks by using a radio access network (RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges language and/or data with the radio access network.

A base station may be a base transceiver station (BTS) in GSM or CDMA, or may be a NodeB (NodeB) in WCDMA, or may be an evolved NodeB (e-NodeB) in LTE. This is not limited in the present invention.

Figure 1:
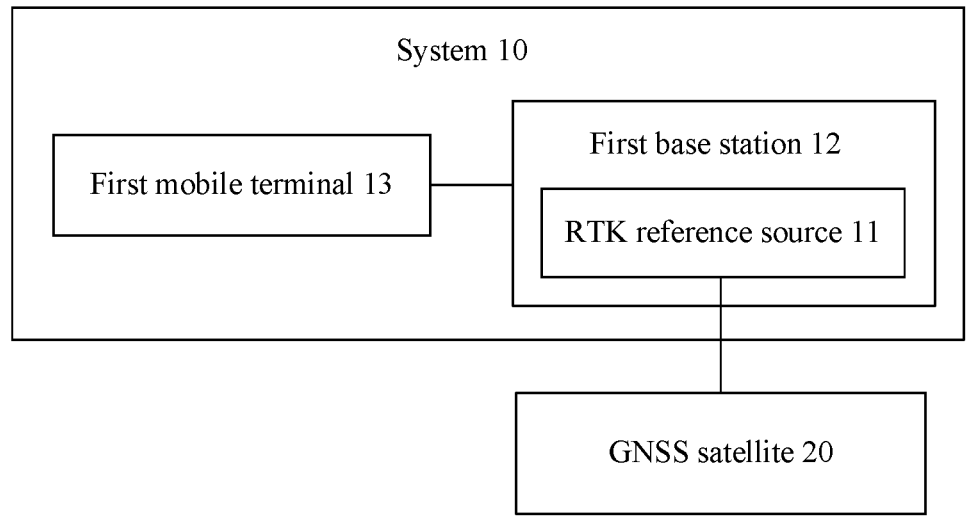
FIG. 1 (a) to FIG. 1 (d) are schematic architecture diagrams of a system applicable to a positioning method in a mobile network in the embodiments of the present invention.
Figure 1:
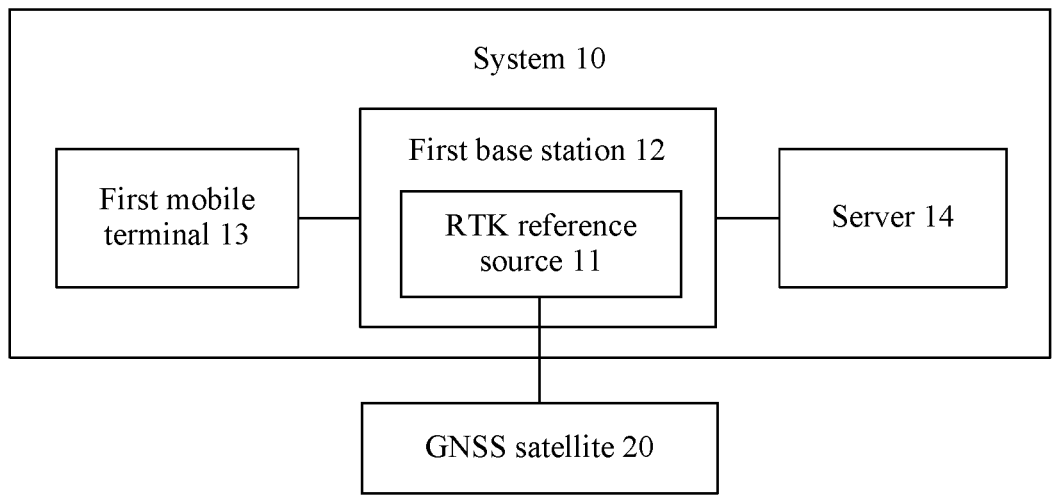
Figure 1:
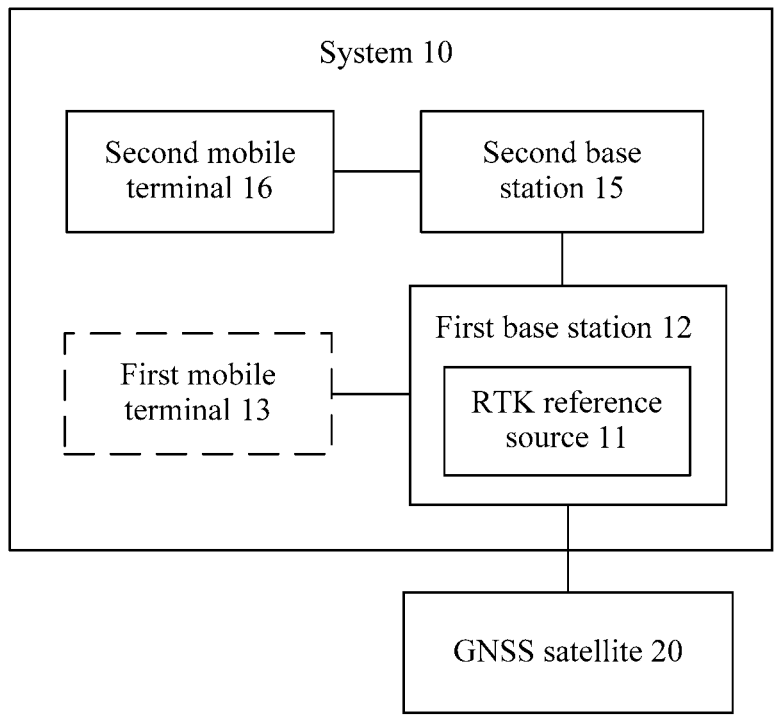
Figure 1:
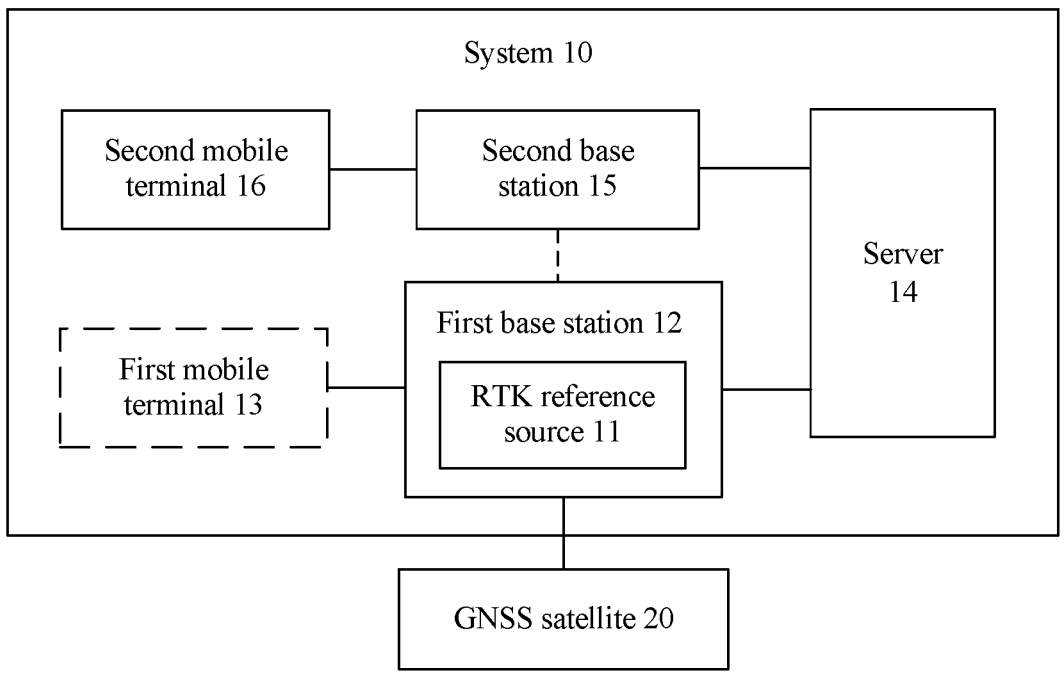

FIG. 1 shows a schematic architecture diagram of a system 10 applicable to a positioning method in a mobile network in the embodiments of the present invention. As shown in FIG. 1 (a), the system 10 may include at least one base station 12 (for ease of description, the base station 12 is hereinafter referred to as a "first base station", and "first" is used for differentiation and identification) on which an RTK reference source is installed, and a mobile terminal 13 (that is, a first mobile terminal) that is in a serving cell (or a wireless network coverage area) of the first base station 12 and that supports a GNSS measurement technology. The first base station 12 is connected to a GNSS satellite 20 by using the RTK reference source. As shown in FIG. 1 (b), the system 10 may include at least one first base station 12, a first mobile terminal 13, at least one server 14. An RTK reference source 11 is installed on the first base station, the first base station 12 receives, by using the RTK reference source, an RTK measurement value sent by a GNSS satellite 20, and the server 14 is connected to the first base station 12. As shown in FIG. 1 (c), the system 10 may include at least one first base station 12, at least one base station 15 (for ease of description, the base station 15 is hereinafter referred to as a "second base station", and "second" is used for differentiation and identification) on which no RTK reference source is installed, and a mobile terminal 16 (that is, a second mobile terminal) that is in a serving cell of the second base station 15 and that supports a GNSS measurement technology. The first base station 12 is connected to a GNSS satellite 20 by using an RTK reference source, and the second base station 15 is connected to the first base station 12 by using an X2 interface. As shown in FIG. 1 (d), the system 10 may include at least one first base station 12, at least one server 14, at least one second base station 15, and a second mobile terminal 16. The first base station 12 is connected to a GNSS satellite 20 by using an RTK reference source, the second base station 15 is connected to the first base station 12 by using an X2 interface, and the first base station 12 and the second base station 15 are separately connected to the server 14. In the system 10, the first base station 12 obtains an RTK measurement value from the GNSS satellite 20 by using the RTK reference source.

It should be understood that the GNSS satellite is merely used as an example for description. All satellites or other positioning devices that are used to measure a location of an RTK reference source in real time shall fall within the protection scope of the present invention.

In this embodiment of the present invention, the mobile terminal 130 may be a mobile terminal that supports a GNSS carrier phase measurement technology. It should be understood that as one of the GNSS measurement technology, the GNSS carrier phase measurement technology is used as an example for description during implementation. For any mobile terminal that supports the GNSS measurement technology, positioning information obtained by the mobile terminal from a GNSS positioning system may be corrected according to correction information obtained by resolving an RTK measurement value. It should be further understood that the GNSS positioning system is merely used as an example for description, and shall not constitute any limitation to the present invention, and another positioning system applied to a mobile network shall fall within the protection scope of the present invention.

The foregoing illustrated system 10 and GNSS satellite 20 that are applicable to the positioning method in a mobile network in the embodiments of the present invention may be collectively referred to as an enhanced-network RTK (E-NRTK) positioning system.

It should be noted that the RTK positioning technology is a real-time dynamic positioning technology based on a carrier phase measurement value. In the RTK positioning technology, it is required to construct a GNSS reference station to continuously measure GNSS satellite data and transfer a measurement result to a floating station (for example, the first mobile terminal, and the second mobile terminal). The floating station resolves a precise location of the floating station according to both the data from the reference station and a GNSS measurement result of the floating station. In this way, precision of the location may reach a centimeter level. Multiple GNSS reference stations that support RTK are connected by using a network technology, to form a network, and the network is integrated with a central station (for example, the first base station, the second base station, or the server). The central station provides a service for the floating station. This is referred to as a network RTK technology.

For ease of understanding and description, the following uses an E-NRTK positioning system as an example to describe in detail the positioning method in a mobile network in the embodiments of the present invention. It should be understood that as a positioning system, the E-NRTK positioning system is merely used as an example for description, and shall not constitute any limitation to the present invention, and any positioning method that applies a network RTK positioning technology to a mobile network shall fall within the protection scope of the present invention.

It should be noted that the foregoing illustrated schematic architecture diagram of the system 10 applicable to the positioning method in a mobile network in the embodiments of the present invention is merely an example for description, and the present invention is not limited to this. For example, the system 10 may further include more first base stations 12 and second base stations 15, and the like, and may further include a first mobile terminal 13 in FIG. 1 (*c*) and FIG. 1 (*d*).

The following describes in detail the positioning method in a mobile network according to the embodiments of the present invention with reference to FIG. 2 to FIG. 10.

Figure 2:
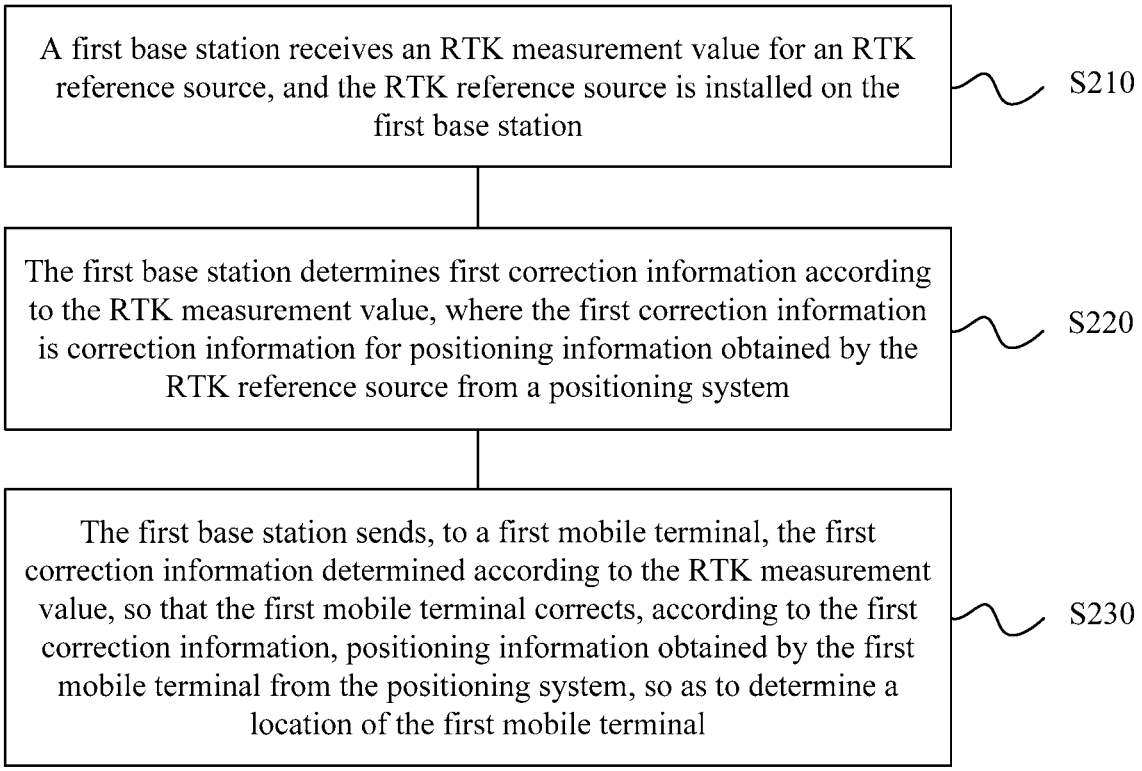
FIG. 2 is a schematic flowchart of a positioning method in a mobile network according to an embodiment of the present invention.

FIG. 2 shows a schematic flowchart of a positioning method 200 in a mobile network according to an embodiment of the present invention, where the positioning method 200 is described from a perspective of a first base station. As shown in FIG. 2, the positioning method 200 includes:

S210. The first base station receives a real-time kinematic RTK measurement value for an RTK reference source.

S220. The first base station determines first correction information according to the RTK measurement value, where the first correction information is correction information for positioning information obtained by the RTK reference source from a positioning system.

S230. The first base station sends the first correction information to a first mobile terminal, so that the first mobile terminal corrects, according to the first correction information, positioning information obtained by the first mobile terminal from the positioning system, so as to determine a location of the first mobile terminal.

In this embodiment of the present invention, as an example instead of a limitation, the first base station may be the first base station 12 in FIG. 1, the first base station 12 receives the RTK measurement value from the GNSS satellite 20 by using the RTK reference source 11, and the first mobile terminal may be the first mobile terminal 13 in FIG. 1.

Specifically, in this embodiment of the present invention, an RTK reference source is installed on a base station to receive an RTK measurement value that is for the RTK reference source and sent by a GNSS satellite, and the base station or a server resolves the RTK measurement value to obtain correction information, to correct positioning information from a GNSS that uses a carrier phase technology, so as to obtain a more precise positioning result.

With development of network technologies and mobile intelligent terminals, a location based service (LBS) is increasingly important and plays an irreplaceable role in terms of rescue, navigation, social intercourse, shopping, and the like, and provides a technical basis for automatic driving, automatic shopping, precise person searching, and the like.

However, none of existing mobile positioning manners such as A-GNSS positioning, OTDOA positioning, and e-CID positioning can provide high-precision positioning within 3 meters. Precision of GPS positioning that is mainly used for a mobile terminal still exceeds 3 meters, and a positioning time of GPS positioning is relatively long.

By contrast, in this embodiment of the present invention, based on the network RTK technology, an RTK reference source is installed on a base station, correction information is determined according to a received RTK measurement value for the RTK reference source, and then positioning information from a GNSS is corrected, so that a mobile terminal can implement high-precision positioning of a meter level, a decimeter level, or a centimeter level.

As an example instead of a limitation, an RTK reference source may be installed on a base station in multiple manners, such as built-in, external connection, or separated connection. The following describes in detail specific manners of installing an RTK reference source on a base station.

Optionally, an RTK reference source may be inserted into a shelf of the base station in a form of a board.

A manner of preparing an RTK board and inserting the RTK board into a shelf of a base station is applicable to a macro base station, an expendable micro base station, or a radio remote unit (RRU). In this manner, there is no need to install an extra interface on the base station. However, due to signal shielding and vibration, and interference from an electromagnetic wave, a measurement precision is relatively low.

Optionally, an RTK reference source may be externally connected to a base station.

An external RTK reference source is constructed. Device sizing, site selection, and construction are performed according to existing Continuously Operating Reference Stations (CORS), and a physical interface is added to the base station. This manner may be used in a high-precision scenario, but costs are relatively high.

Optionally, an RTK reference source may be divided into two parts: a receiver and an antenna, the receiver is built in the base station, and the antenna is externally connected to the base station.

As a part of the RTK reference source, the receiver is mainly used for transmission and an operation, and may be built in the base station, or integrated into an existing board of the base station in a software manner. The antenna is mainly configured to receive a signal, and may be constructed outside the base station and connected by using an interface, so as to improve received signal quality. In addition, the RTK reference source is installed in a separated manner, so that installation costs and maintenance costs can be reduced.

It should be noted that the foregoing illustrated specific manners of installing an RTK reference source on a base station are merely examples for description, and shall not constitute any limitation to the present invention, and any method of installing an RTK reference source inside or outside a base station and implementing receiving of an RTK measurement value by the base station shall fall within the protection scope of the present invention.

In S210, the GNSS satellite sends, to the first base station, the RTK measurement value for the RTK reference source installed on the first base station. The RTK measurement value may be carried by using a message sent by the GNSS satellite to the first base station. As an example instead of a limitation, the RTK measurement value sent by the GNSS satellite to the first base station may have a Radio Technology Committee of Marine (RTCM) format, and an RTK measurement value having the RTCM format may be carried by a Networked Transport of RTCM via Internet Protocol (Ntrip) message.

It should be noted that the foregoing illustrated Ntrip message and RTCM format are merely examples for description, the RTK measurement value may also be carried by using another protocol message, and the RTK measurement value may also be of a compact measurement record (CMR) format, a CMR+ format, or the like. The present invention sets no special limitation thereto.

In S220, the first base station determines the first correction information according to the RTK measurement value. The first correction information may be determined by the first base station by resolving the RTK measurement value, or may be determined by another physical network element and then sent to the first base station. For example, the physical network element may be a server.

The following describes in detail a relationship between the RTK reference source, the RTK measurement value, and correction information (including the first correction information).

Because the RTK reference source serves as a reference station, location information of the RTK reference source is determined when the RTK reference source is installed, and has relatively high precision. The location information of the RTK reference source is compared with the positioning information obtained by the RTK reference source from the positioning system, to obtain a differential correction parameter. The differential correction parameter is a result obtained by using known and accurate location information to correct the positioning information obtained by the positioning system, that is, the RTK measurement value. The first base station serves as a central station, and resolves the RTK measurement value to obtain the correction information. The correction information may be used to correct positioning information obtained by a floating station in a location of the RTK reference source from the positioning system, and may further be used to correct positioning information obtained by a floating station in an effective coverage area (or preset area) of the RTK reference source from the positioning system.

Without loss of generality, the E-NRTK positioning system in the embodiments of the present invention includes a GNSS satellite, a reference station, a central station, and a floating station. The RTK reference source is installed on the first base station, and therefore the first base station serves as a reference station. When the first base station resolves the RTK measurement value, the first base station serves as both a reference station and a central station; or if the first base station sends the RTK measurement value to the server, and the server performs resolving, the server serves as a central station. The first mobile terminal is a floating station in the E-NRTK positioning system, receives the first correction information obtained by means of resolving, and positions a location of the first mobile terminal according to the first correction information.

It should be noted that the central station may be understood as a functional module, and is configured to resolve the RTK measurement value, so as to determine correction information. In this embodiment of the present invention, the central station may be the first base station, or may be the server, or may be another physical network element. The present invention sets no special limitation thereto. The server may be a gateway mobile location center (GMLC), an evolved serving mobile location center (E-SMLC), or the like. Alternatively, another network element may be used to perform resolving processing on the RTK measurement value and manage correction information. The present invention sets no special limitation to specific content of the server.

In S230, the first base station may send the first correction information to the first mobile terminal. In an example in which the first mobile terminal serves as a floating station in the effective coverage area of the RTK reference source, a distance between the first mobile terminal and the first base station falls within a preset range, that is, the first mobile terminal is located in a preset area of the first base station. The first mobile terminal may use the first correction information to correct the positioning information from the GNSS. As an example instead of a limitation, the first correction information may be carried in a message sent by the first base station to the first mobile terminal. The base station may also send the correction information to the mobile terminal by using another cell broadcast or another message. The present invention sets no special limitation thereto.

In this embodiment of the present invention, when the distance between the first mobile terminal and the first base station falls within the preset range, the first correction information is used to correct the GNSS positioning information of the first mobile terminal. The preset range may be an effective area covered by the first base station on which the RTK reference source is installed. That is, within the preset range, a positioning result corrected by using the first correction information can still remain relatively high precision. In other words, the effective coverage area of the RTK reference source is far larger than the coverage area of the first base station (or a wireless network coverage area of the first base station), and in the effective coverage area (or the preset range), impact of the distance between the first mobile terminal and the first base station on a positioning result is merely at a decimeter level. That is, the first correction information may be used to correct GNSS positioning information of a mobile terminal (including the first mobile terminal) in the wireless network coverage area of the first base station.

Optionally, that the first base station sends the first correction information to a first mobile terminal, so that the first mobile terminal corrects, according to the first correction information, positioning information obtained by the first mobile terminal from the positioning system, so as to determine a location of the first mobile terminal includes:

sending, by the first base station, a cell broadcast message, where the cell broadcast message carries the first correction information, so that the first mobile terminal corrects, according to the first correction information, the positioning information obtained by the first mobile terminal from the positioning system, so as to determine the location of the first mobile terminal.

Specifically, the first base station may send the first correction information to a mobile terminal (including the first mobile terminal) in a serving cell of the first base station by using a cell broadcast message. Optionally, the cell broadcast message includes a first system information block (SIB) message. For example, the first SIB message may be carried in a radio resource control (RRC) message.

In this embodiment of the present invention, the first base station may send the first correction information to the first mobile terminal by using the cell broadcast message, for example, send the first correction information to the first mobile terminal by using a SIB message.

It should be noted that the foregoing illustrated cell broadcast, SIB message, and RRC message are merely examples for description, and shall not constitute any limitation to the present invention, and the first base station may also send the first correction information to the first mobile terminal by using another cell broadcast or another message.

Therefore, according to the positioning method in this embodiment of the present invention, the RTK reference source is disposed on a base station side, the correction information is determined according to the RTK measurement value, and the correction information is sent to the mobile terminal, so that the mobile terminal corrects, according to the correction information, the positioning information obtained from the positioning system, so as to determine high-precision positioning information for the mobile terminal, thereby meeting requirements of a large quantity of mobile users for high-precision positioning.

The following describes in detail the positioning method in a mobile network according to the embodiments of the present invention with reference to FIG. 3 to FIG. 10.

In the embodiments of the present invention, the first base station may serve as a reference station and a central station (Case A); or the first base station may serve as a reference station, and the server serves as a central station (Case B). The following describes in detail the positioning method in a mobile network according to the embodiments of the present invention with reference to FIG. 3 to FIG. 5 by using examples of the foregoing two cases (Case A and Case B).

It should be noted that in the embodiments of the present invention, RTK reference sources may be installed on all base stations, and all the base stations are reference stations, and receive RTK measurement values for the RTK reference sources. That is, all the base stations may be first base stations, and mobile terminals in serving cells of all the first base stations are first mobile terminals.

It should be further noted that the first base station may resolve the received RTK measurement value, and in this case, the first base station serves as both a reference station and a central station. In this case, there is no need to add an interface connected to the server, and a speed of obtaining correction information is fast, but workload of the first base station is heavy. The first base station may also send the RTK measurement value to the server, and the server performs resolving. In this case, the first base station is a reference station, and the server is a central station. This reduces calculation load of the first base station, but relies on the server; in addition, because the server is generally installed on a network element in a core network, it is required to add an interface between the first base station and the core network, and therefore, an arrival time of the correction information is prolonged.

Case A

Optionally, the first correction information includes a single-reference-station differential correction parameter. That the first base station determines first correction information according to the RTK measurement value, where the first correction information is correction information for positioning information obtained by the RTK reference source from a positioning system includes:

determining, by the first base station, the single-reference-station differential correction parameter according to the RTK measurement value, where the single-reference-station differential correction parameter is correction information for the positioning information obtained by the RTK reference source from the positioning system; and That the first base station sends the first correction information to a first mobile terminal, so that the first mobile terminal corrects, according to the first correction information, positioning information obtained by the first mobile terminal from the positioning system, so as to determine a current location of the first mobile terminal includes:

sending, by the first base station, the single-reference-station differential correction parameter to the first mobile terminal, so that the first mobile terminal corrects, according to the single-reference-station differential correction parameter, the positioning information obtained by the first mobile terminal from the positioning system, so as to determine the location of the first mobile terminal.

Specifically, the Case A may be corresponding to the system architecture in FIG. 1 (a). After receiving the RTK measurement value, the RTK reference source on the first base station resolves the RTK measurement value to obtain the first correction information, and transmits the first correction information to the first base station by using the foregoing receiver or connected interface. Because the RTK measurement value is a measurement value for the RTK reference source, the first correction information obtained by resolving the RTK measurement value is a single-reference-station differential correction parameter for the first base station. The first base station sends the first correction information to the first mobile terminal, so that the first mobile terminal corrects the positioning information from the GNSS according to the single-reference-station differential correction parameter, so as to determine the current location of the first mobile terminal.

Figure 3:
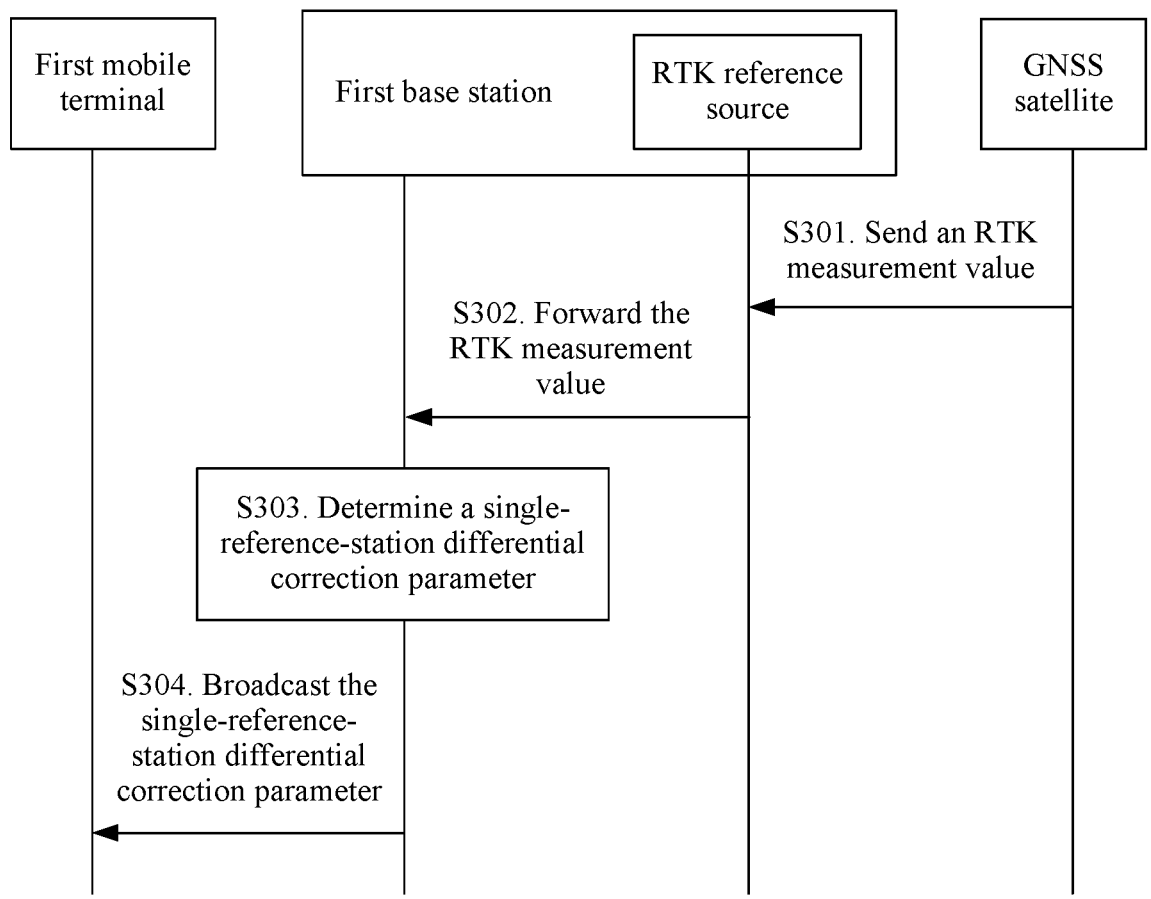
FIG. 3 is another schematic flowchart of a positioning method in a mobile network according to an embodiment of the present invention.

For ease of understanding, the following describes in detail a positioning method 300 in a mobile network according to an embodiment of the present invention with reference to FIG. 3 by using an example in which a first base station serves as a reference station and a central station.

As shown in FIG. 3, the positioning method 300 includes:

S301. An RTK reference source may serve as a reference station, and receive an RTK measurement value that is for the RTK reference source and that is sent by a GNSS satellite, where the RTK measurement value may be carried by an Ntrip message.

S302. The RTK reference source forwards the RTK measurement value to the first base station.

S303. The first base station may serve as a central station, perform resolving according to the received RTK measurement value, and determine first correction information, that is, a single-reference-station differential correction parameter.

S304. The first base station sends the single-reference-station differential correction parameter to a first mobile terminal, where the single-reference-station differential correction parameter may be sent to the first mobile terminal in a SIB broadcasting manner.

It should be noted that the RTK reference source continuously receives an RTK measurement value sent by the GNSS satellite, and continuously reports the RTK measurement value to the first base station, so that the first base station determines first correction information according to the RTK measurement value, so as to update the first correction information in real time.

It should be further noted that the first mobile terminal corresponding to the first base station serves as a floating station, and may be a resident mobile terminal in a serving cell of the first base station, or may be a mobile terminal that roams from another cell to a serving cell of the first base station. The present invention sets no special limitation thereto. For any mobile terminal that supports a GNSS carrier phase measurement technology, as long as the mobile terminal enters an area of the serving cell of the first base station, the mobile terminal can receive the first correction information sent by the first base station, so as to determine a current location of the mobile terminal, and the mobile terminal has the same positioning precision as a resident mobile terminal in the cell.

It should be further noted that the foregoing specific process of resolving the RTK measurement value belongs to the prior art, and the present invention sets no special limitation thereto.

By contrast, a floating station in a CORS system and the CORS system need to belong to a same administrative region, such as a same province, and a CORS system and a floating station that are in different provinces cannot be connected to each other or communicate with each other. A floating station corresponding to a CORS system in a province A cannot receive a message broadcast by a CORS system in a province B. That is, if a floating station moves, smooth handover cannot be implemented.

However, in this embodiment of the present invention, an RTK reference source is installed on a base station, and all base stations send cell broadcast messages of a same format to mobile terminals, so that when a mobile terminal moves to a different area, the mobile terminal can be smoothly handed over to a base station serving cell to which a current location of the mobile terminal belongs.

Case B

Optionally, the first correction information includes a single-reference-station differential correction parameter. That the first base station determines first correction information according to the RTK measurement value, where the first correction information is correction information for positioning information obtained by the RTK reference source from a positioning system includes:

sending, by the first base station, the RTK measurement value to a server; and receiving, by the first base station, the single-reference-station differential correction parameter sent by the server, where the single-reference-station differential correction parameter is determined by the server according to the RTK measurement value, and the single-reference-station differential correction parameter is correction information for the positioning information obtained by the RTK reference source from the positioning system.

That the first base station sends the first correction information to a first mobile terminal, so that the first mobile terminal corrects, according to the first correction information, positioning information obtained by the first mobile terminal from the positioning system, so as to determine a location of the first mobile terminal includes:

sending, by the first base station, the single-reference-station differential correction parameter to the first mobile terminal, so that the first mobile terminal corrects, according to the single-reference-station differential correction parameter, the positioning information obtained by the first mobile terminal from the positioning system, so as to determine the location of the first mobile terminal.

Specifically, the Case B may be corresponding to the system architecture in FIG. 1 (b). After receiving the RTK measurement value, the RTK reference source on the first base station does not process the RTK measurement value, but directly sends the RTK measurement value to the server (for example, an E-SMLC) installed in a core network. The server performs resolving processing on the RTK measurement value, and feeds back the first correction information obtained by means of resolving to the first base station, so that the first base station sends the first correction information to a first mobile terminal.

Optionally, the sending, by the first base station, the RTK measurement value to a server includes:

sending, by the first base station, a first LTE positioning protocol A (LPPa) message to the server, where the first LPPa message carries the RTK measurement value.

The receiving, by the first base station, the single-reference-station differential correction parameter sent by the server includes:

receiving, by the first base station, a second LPPa message sent by the server, where the second LPPa message carries the single-reference-station differential correction parameter.

In this embodiment of the present invention, as a communication protocol between a base station and a server, the LTE positioning protocol A (LPPa) message is used to carry positioning information transmitted between the first base station and the server.

By contrast, as a communication protocol between a base station and a mobile terminal, an LTE positioning protocol (LPP) message is used to carry any positioning information transmitted between the base station and the mobile terminal.

It should be noted that the foregoing illustrated LPPa message used to carry positioning information between a base station and a server and LPP message used to carry positioning information between a mobile terminal and a server are merely examples for description, and shall not constitute any limitation to the present invention. The positioning information between a base station and a server and the positioning information between a mobile terminal and a server may also be carried by other messages, and the present invention sets no special limitation thereto.

Figure 4:
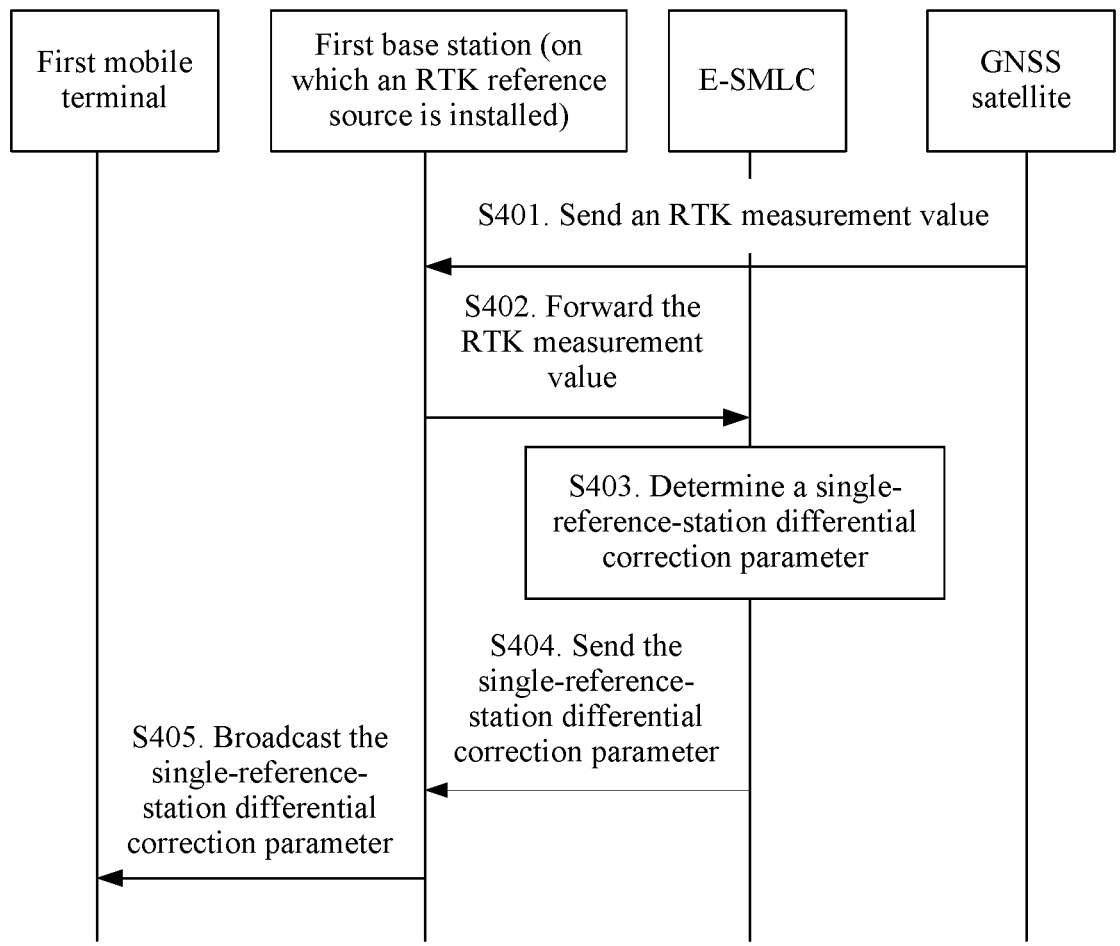
FIG. 4 is still another schematic flowchart of a positioning method in a mobile network according to an embodiment of the present invention.

For ease of understanding, the following describes in detail a positioning method 400 in a mobile network according to an embodiment of the present invention with reference to FIG. 4 by using an example in which a first base station serves as a reference station, and an E-SMLC (that is, an example of a server) serves as a central station.

As shown in FIG. 4, the positioning method 400 includes:

S401. The first base station may serve as a reference station, and receive an RTK measurement value that is for an RTK reference source and that is sent by a GNSS satellite, where the RTK measurement value may be carried by an Ntrip message.

S402. The first base station forwards the RTK measurement value to the E-SMLC, where the RTK measurement value may be carried by a first LPPa message.

S403. The E-SMLC serves as a central station, performs resolving according to the received RTK measurement value, and determines first correction information, that is, a single-reference-station differential correction parameter.

S404. The E-SMLC sends the single-reference-station differential correction parameter to the first base station, where the single-reference-station differential correction parameter may be carried by a second LPPa message.

S405. The first base station forwards the single-reference-station differential correction parameter to a first mobile terminal, where the single-reference-station differential correction parameter may be sent to the first mobile terminal in a SIB broadcasting manner.

It should be noted that the first base station continuously receives an RTK measurement value sent by the GNSS satellite, and continuously reports the RTK measurement value to the E-SMLC, so that after determining second correction information according to the RTK measurement value, the E-SMLC can send the second correction information to a second base station at a specific frequency (for example, once per second), so as to update the second correction information in real time.

Therefore, according to the positioning method in this embodiment of the present invention, the server determines the correction information according to the RTK measurement value sent by the first base station, and forwards the correction information to the mobile terminal by using the base station, so that the mobile terminal corrects, according to the correction information, the positioning information obtained by the mobile terminal from the positioning system, so as to determine high-precision positioning information for the mobile terminal, thereby meeting requirements of a large quantity of mobile users for high-precision positioning, and reducing workload of the base station.

Optionally, the method 200 further includes:

receiving, by the first base station, a first positioning certificate sent by the server, where the first positioning certificate is corresponding to a second positioning certificate sent by the server to the first mobile terminal, so that the first mobile terminal obtains the first correction information from the first base station according to the second positioning certificate.

Specifically, when high-precision positioning needs to be performed on the first mobile terminal, a positioning request needs to be first sent to the server. According to the positioning request, the server may send the first positioning certificate to the first base station and send the second positioning certificate to the first mobile terminal. The first positioning certificate is corresponding to the second positioning certificate. The first mobile terminal obtains the first correction information from the first base station according to the second positioning certificate.

Optionally, the receiving, by the first base station, a first positioning certificate sent by the server includes:

receiving, by the first base station, a third LPPa message sent by the server, where the third LPPa message carries the first positioning certificate.

Optionally, that the first base station sends the first SIB message to the first mobile terminal includes:

sending, by the first base station, the first SIB message to the first mobile terminal, where the first SIB message carries the first positioning certificate, so that the first mobile terminal obtains the first correction information according to the second positioning certificate.

Specifically, the first SIB message sent by the first base station to the first mobile terminal may carry the first correction information and the first positioning certificate. After receiving the first SIB message, the first mobile terminal may obtain the first correction information according to the second positioning certificate corresponding to the first positioning certificate, and perform high-precision positioning.

In this embodiment of the present invention, the server adds the first positioning certificate to the third LPPa message, and adds the second positioning certificate to an LPP message, so as to send corresponding positioning certificates to the first mobile terminal and the first base station respectively.

In this embodiment of the present invention, the server may be a network element in a core network, or may be a functional module on a base station. When the server is a network element (for example, an E-SMLC) in a core network, as an important network element in the core network, a mobility management entity (MME) may serve as a gateway of the server. When high-precision positioning needs to be performed on the first mobile terminal, a positioning request needs to be first sent to the MME to apply for a positioning permission, and after MME authentication succeeds, the positioning request is forwarded to the server.

It should be understood that, that the MME serves as the gateway of the server is merely an example for description, and shall not constitute any limitation to the present invention, and the present invention is not limited to this. When the server exists on a base station or another network entity, the server may directly interact with a positioning service terminal, or another network element serves as a gateway of the server.

Figure 5:
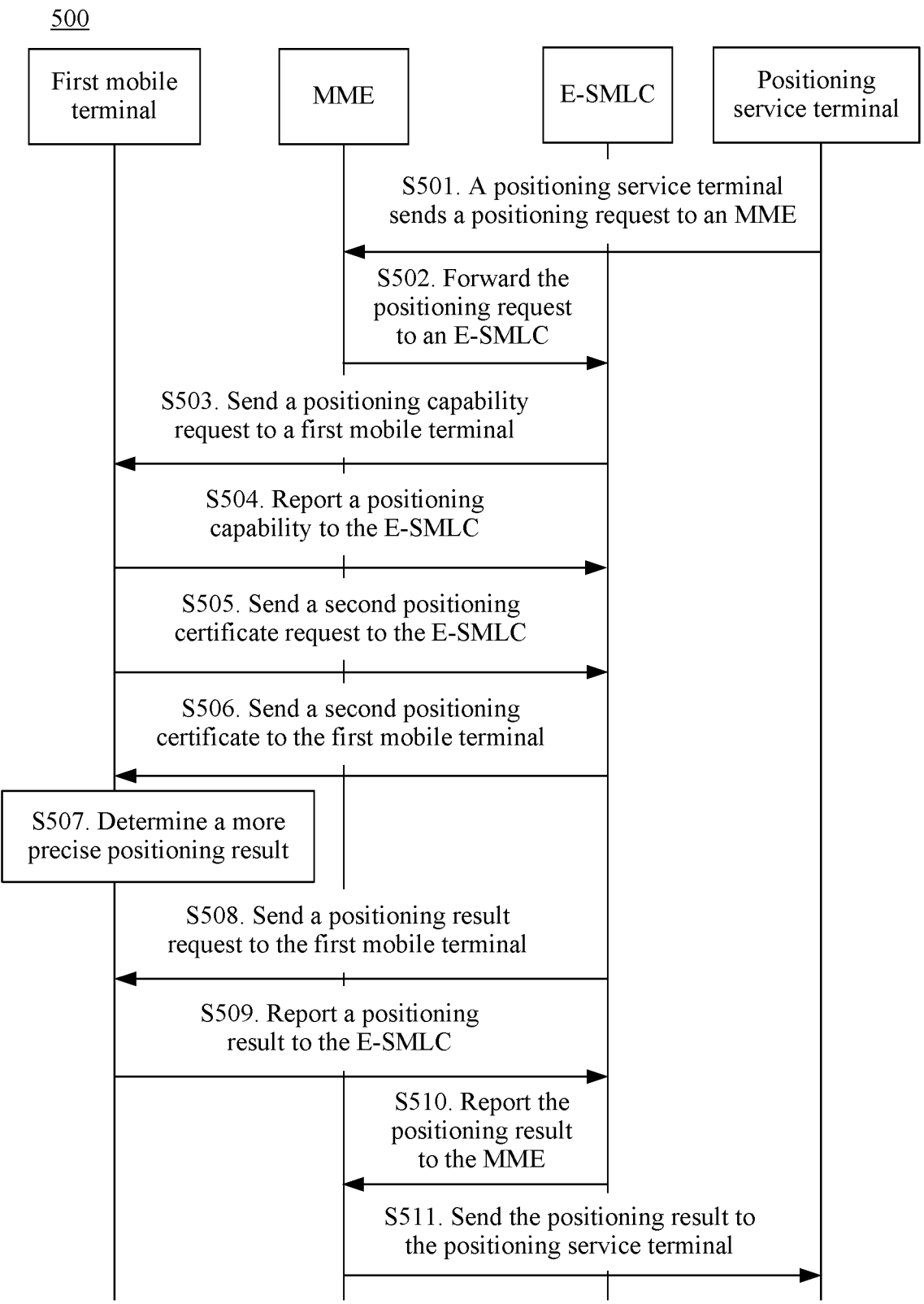
FIG. 5 is yet another schematic flowchart of a positioning method in a mobile network according to an embodiment of the present invention.

The following describes in detail, with reference to FIG. 5 by using an example in which an E-SMLC serves as a server, a positioning method 500 in which a positioning service terminal requests to position a first mobile terminal.

As shown in FIG. 5, the positioning method 500 includes:

S501. The positioning service terminal sends a positioning request to an MME, to request to perform high-precision positioning for the first mobile terminal.

S502. The MME performs authentication on the positioning request, and after the MME authentication succeeds, the MME forwards the positioning request to the E-SMLC for processing.

S503. The E-SMLC sends, according to the positioning request, a positioning capability request to the first mobile terminal that needs to be positioned, and if the first mobile terminal meets the following conditions: (a) A GNSS signal is normal; (b) GNSS carrier phase measurement is supported; (c) A subscriber identity module (SIM) card has a high-precision positioning permission; and (d) A positioning/location reporting function is enabled, S504 is performed.

S504. The first mobile terminal reports a positioning capability to the E-SMLC, to notify the E-SMLC that the first mobile terminal meets the positioning conditions.

S505. The first mobile terminal sends a second positioning certificate request to the E-SMLC.

S506. The E-SMLC sends the second positioning certificate to the first mobile terminal according to the positioning capability reported by the first mobile terminal, and then the positioning service terminal may perform high-precision positioning for the first mobile terminal.

S507. The first mobile terminal corrects GNSS positioning information according to first correction information from a first base station, so as to determine a more precise positioning result. A specific process in which the first base station obtains the first correction information and forwards the first correction information to the mobile terminal is described in detail in the foregoing methods. The first base station may obtain the first correction information by means of resolving by the first base station or resolving by the E-SMLC. For brevity, details are not described herein.

S508. The E-SMLC sends a positioning result request to the first mobile terminal.

S509. After receiving the positioning result request, the first mobile terminal reports the positioning result to the E-SMLC.

S510. After receiving the positioning result, the E-SMLC reports the positioning result to the MME.

S511. The MME sends the positioning result to the positioning service terminal, and then the request of the positioning service terminal for high-precision positioning for the first mobile terminal is completed.

Specially, if the first mobile terminal does not enable the positioning/location reporting function, the E-SMLC may trigger, according to the positioning request of the positioning service terminal, the first mobile terminal to download the second positioning certificate, so as to enable the positioning/location reporting function.

It should be understood that sequence numbers of the foregoing processes do not mean execution sequences. Execution sequences of the processes should be determined according to functions and internal logic of the processes, and shall not set any limitation on implementation processes of the embodiments of the present invention. For example, in this embodiment of the present invention, S505 and S506 may be performed before S501, or may be performed at any time after S501 and before S504.

It should be noted that information exchanged between the first mobile terminal and the E-SMLC in S503, S504, S505, S507, S508, and S509 in the method 500 may be carried by using an LPP message. LPP is a protocol used for communication between user equipment and a positioning service center in LTE.

It should be further noted that the foregoing illustrated MME, E-SMLC, positioning service terminal are merely examples for description, and shall not constitute any limitation to the present invention, and the present invention is not limited to these.

In this embodiment of the present invention, the positioning request may be sent by the first mobile terminal to the server, or may be sent by another positioning service terminal to the server, to request for high-precision positioning for a specific mobile terminal. For example, a rescue center sends a positioning request to request for high-precision positioning for a casualty on a disaster site; or a relevant public security department sends a positioning request to request for high-precision positioning for a missing child. The present invention sets no special limitation thereto.

Optionally, the server may also send the first positioning certificate to the first base station in advance, and send the second positioning certificate to a resident first mobile terminal in a serving cell of the first base station in advance, so that the first mobile terminal performs high-precision positioning at any time, thereby saving a positioning request time. Alternatively, the server may periodically send an updated first positioning certificate and second positioning certificate to the first base station and the first mobile terminal respectively, so as to prevent intrusion by malicious software. The foregoing describes in detail, from the perspective of the first base station, the case in which the first base station serves as a reference station and a central station, and the case in which the first base station serves as a reference station and the server serves as a central station. The following describes in detail a case (Case C) in which the first base station serves as a reference station, and the first base station and a second base station both serve as central stations, and a case (Case D) in which the first base station serves as a reference station, the server serves as a central station, and the second base station serves as a floating station.

Figure 6:
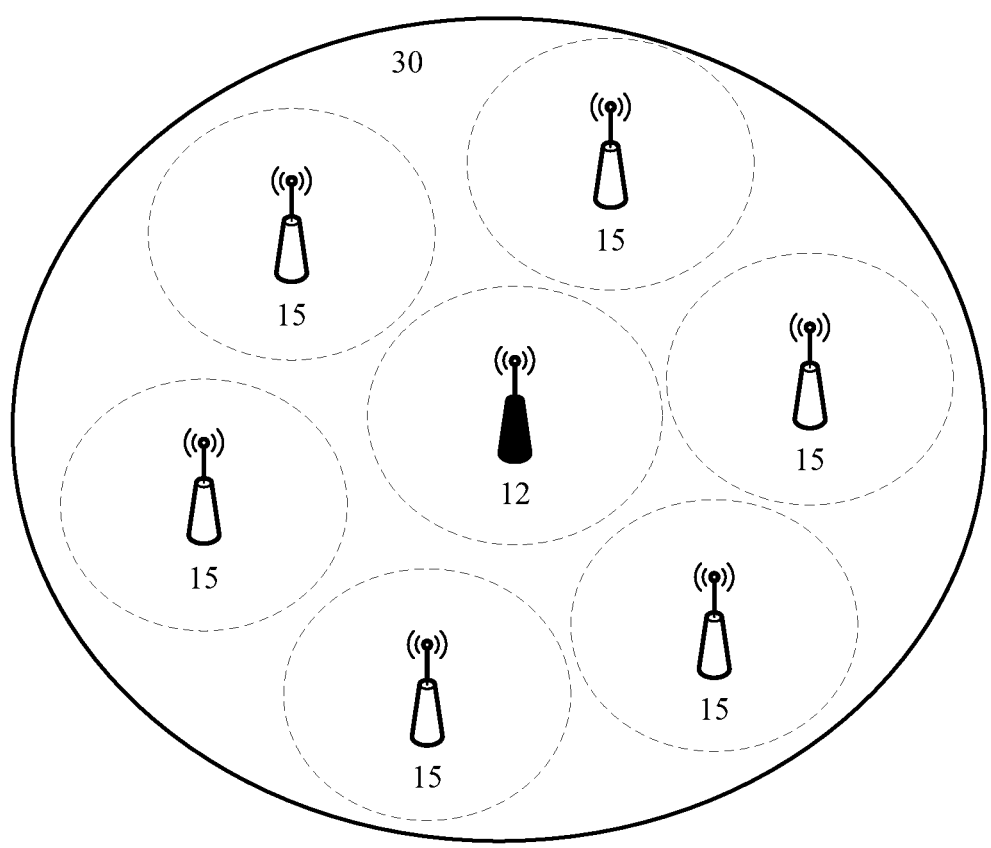
FIG. 6 is a schematic diagram of distribution of base stations applicable to a positioning method in a mobile network in an embodiment of the present invention.

It should be noted that in this embodiment of the present invention, because a coverage area of an RTK reference source is larger than an area of a serving cell of a base station, in a coverage area of one RTK reference source, there may be multiple base stations. As shown in FIG. 6, in a coverage area 30 (shown by a solid line in FIG. 6) of one RTK reference source, a solid base station represents the first base station 12, a hollow base station represents the second base station 15, and each base station is corresponding to one serving cell (shown by a dashed line in FIG. 6). For example, the first base station 12 is corresponding to the first mobile terminal, and the second base station is corresponding to a second mobile terminal. Therefore, the first base station may be constructed according to a specific coverage ratio, so as to reduce construction costs and maintenance costs of the first base station.

As an example instead of a limitation, the E-NRTK positioning system in this embodiment of the present invention includes a GNSS satellite, a reference station, a central station, and a floating station. The RTK reference source is installed on the first base station, and therefore the first base station serves as a reference station; the first base station resolves the RTK measurement value to determine the first correction information, and sends the RTK measurement value to a neighboring second base station, so that the second base station resolves the RTK measurement value to determine second correction information; the first base station and the second base station are both central stations. Alternatively, the first base station sends the RTK measurement value to the server, the server separately resolves the RTK measurement value for the first base station and a second base station according to configuration information of the first base station and the second base station, so as to determine the first correction information and second correction information, and sends the first correction information and the second correction information to the first base station and the second base station respectively; that is, the server is a central station, and the second base station is a floating station. The first base station sends the first correction information to the first mobile terminal, and the second base station sends the second correction information to a second mobile terminal, so that the first mobile terminal and the second mobile terminal determine respective positions of the first mobile terminal and the second mobile terminal. That is, the first mobile terminal and the second mobile terminal are floating stations in the E-NRTK positioning system.

Optionally, the method 200 further includes:

sending, by the first base station, the RTK measurement value, so that a second base station sends, to a second mobile terminal, second correction information determined according to the RTK measurement value, so that the second mobile terminal corrects, according to the second correction information, positioning information obtained by the second mobile terminal from the positioning system, so as to determine a location of the second mobile terminal. The "second" in the second correction information is used to distinguish different pieces of correction information (the first correction information) instead of limiting a sequence.

Specifically, the first base station may directly send the RTK measurement value to the second base station, and the second base station resolves the RTK measurement value to obtain the second correction information (Case C); or the first base station may send the RTK measurement value to the server, and after obtaining the second correction information by means of resolving, the server sends the second correction information to the second base station (Case D); and then the second base station sends the second correction information to the second mobile terminal.

The following describes in detail the positioning method in a mobile network according to the embodiments of the present invention with reference to FIG. 7 to FIG. 10 by using the Case C and the Case D as examples.

Case C

Optionally, the sending, by the first base station, the RTK measurement value, so that a second base station sends, to a second mobile terminal, second correction information determined according to the RTK measurement value, so that the second mobile terminal corrects, according to the second correction information, positioning information obtained by the second mobile terminal from the positioning system, so as to determine a location of the second mobile terminal includes:

sending, by the first base station, the RTK measurement value to the second base station, so that the second base station sends the second correction information to the second mobile terminal, so that the second mobile terminal corrects, according to the second correction information, the positioning information obtained by the second mobile terminal from the positioning system, so as to determine the location of the second mobile terminal, where the second correction information is determined by the second base station according to the RTK measurement value.

Specifically, the Case C may be corresponding to the system architecture in FIG. 1 (c). The first base station is connected to the second base station by using an X2 interface, and the first base station may directly send the RTK measurement value to the second base station by using the X2 interface. The second base station serves as a central station, and resolves the RTK measurement value to determine the second correction information.

In this embodiment of the present invention, if the second base station is located in a preset area of the first base station, or when the second base station is located in a coverage area of the RTK reference source, the second base station may directly determine a single-reference-station differential correction parameter according to the RTK measurement value. Although the single-reference-station differential correction parameter is correction information for the first base station (that is, the first correction information), because in the preset area, impact of using the single-reference-station differential correction parameter on positioning results of the second base station and the second mobile terminal is merely at a decimeter level, the single-reference-station differential correction parameter may be directly used as correction information for the second base station (that is, the second correction information).

Optionally, the second correction information sent by the second base station to the second mobile terminal is carried in a second SIB message.

It should be noted that the foregoing illustrated second SIB message carrying the second correction information is merely an example for description, and shall not constitute any limitation to the present invention, and the present invention is not limited to this. Another cell broadcast or message used to carry correction information shall fall within the protection scope of the present invention.

Figure 7:
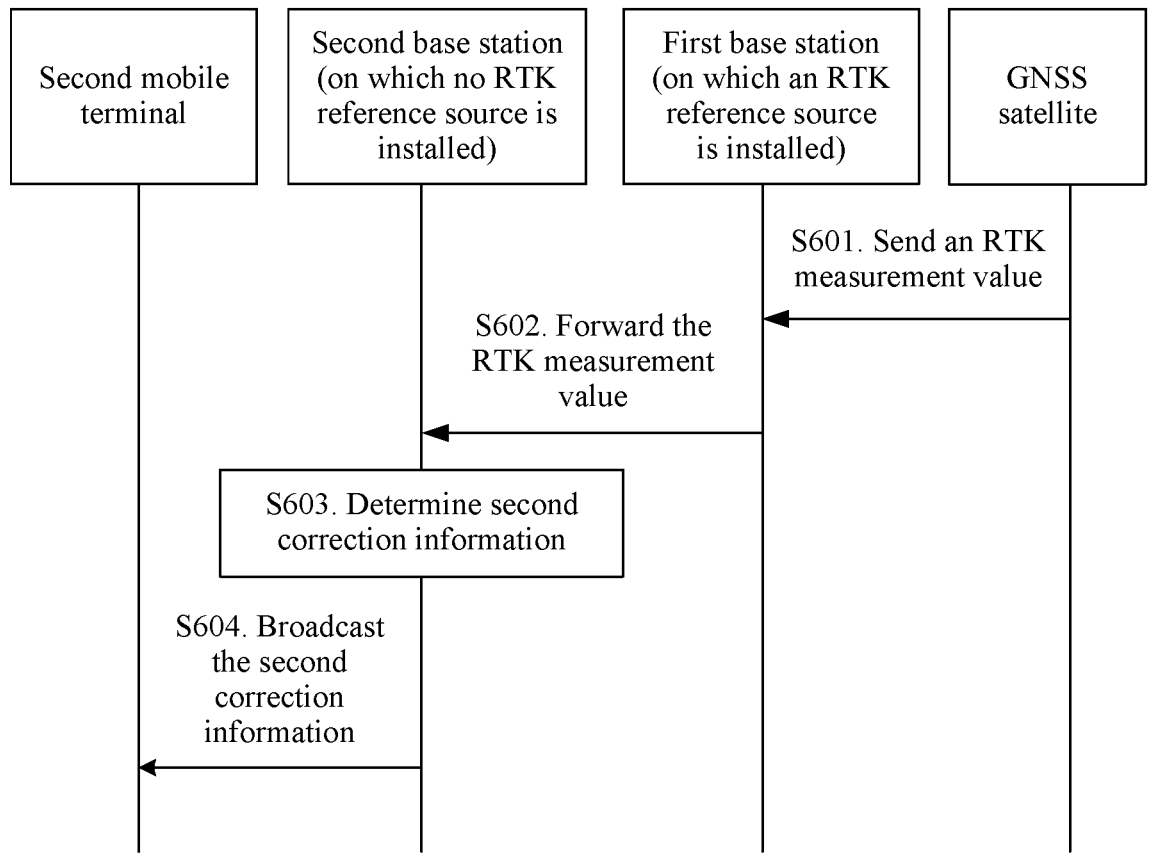
FIG. 7 is yet another schematic flowchart of a positioning method in a mobile network according to an embodiment of the present invention.

For ease of understanding, the following describes in detail a positioning method 600 in a mobile network according to an embodiment of the present invention with reference to FIG. 7 by using an example in which a first base station serves as a reference station and a second base station serves as a central station.

As shown in FIG. 7, the positioning method 600 includes:

S601. The first base station may serve as a reference station, and receive an RTK measurement value that is for an RTK reference source and that is sent by a GNSS satellite, where the RTK measurement value may be carried by an Ntrip message.

S602. The first base station forwards the RTK measurement value to the second base station by using an X2 interface.

S603. The second base station serves as a central station, and performs resolving according to the RTK measurement value to determine second correction information (for example, a single-reference-station differential correction parameter, a master-auxiliary concept (MAC) unit differential correction parameter, or a virtual reference station (VRS) differential correction parameter).

S604. The second base station sends the second correction information to a second mobile terminal, where the second correction information may be sent to the second mobile terminal in a SIB broadcasting manner.

It should be understood that the foregoing illustrated resolving methods are merely examples for description, and a method for resolving the RTK measurement value by the second base station further includes an area correction parameter (Flachen-Korrektur-Parameter, "FKP" for short) method, and the like. The present invention sets no special limitation thereto. Any method for receiving, by using a server, an RTK measurement value sent by a CORS central station and resolving the RTK measurement value to obtain correction information shall fall within the protection scope of the present invention.

It should be noted that the RTK reference source continuously receives an RTK measurement value sent by the GNSS satellite, and continuously reports the RTK measurement value to the first base station, so that the first base station determines second correction information according to the RTK measurement value, so as to update the second correction information in real time.

It should be noted that the second base station needs to determine, according to a distance between the second base station and the first base station, whether the second base station is located in a coverage area of the RTK reference source on the first base station. The RTK measurement value carries location information of the first base station, and the second base station may determine, according to the RTK measurement value, whether the second base station is located in the coverage area of the RTK reference source. If the second base station is located in the coverage area of the RTK reference source, the second base station may directly use the single-reference-station differential correction parameter obtained by resolving the RTK measurement value.

It should be further noted that the first base station continuously receives an RTK measurement value sent by the GNSS satellite, and forwards the RTK measurement value to the second base station, so that the second base station determines second correction information according to the RTK measurement value, and the second base station may send the second correction information to the second base station at a specific frequency (for example, once per second), so as to update the second correction information in real time.

Optionally, the sending, by the first base station, the RTK measurement value, so that a second base station sends, to a second mobile terminal, second correction information determined according to the RTK measurement value, so that the second mobile terminal corrects, according to the second correction information, positioning information obtained by the second mobile terminal from the positioning system, so as to determine a location of the second mobile terminal includes:

sending, by the first base station, the RTK measurement value to the second base station by using N forward base stations, so that the second base station sends the second correction information to the second mobile terminal, so that the second mobile terminal corrects, according to the second correction information, the positioning information obtained by the second mobile terminal from the positioning system, so as to determine the location of the second mobile terminal, where N is determined according to a time-to-live value of the RTK measurement value, the RTK reference source is not installed on the forward base stations, and the second correction information is determined by the second base station according to the RTK measurement value.

Specifically, when a second base station has no neighboring first base station nearby, the second base station may obtain, from a surrounding second base station by using an X2 interface, the RTK measurement value sent by the first base station.

Figure 8:
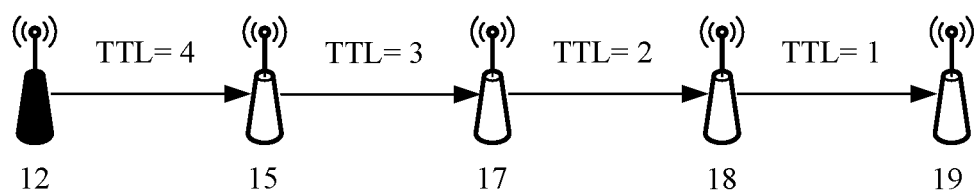
FIG. 8 is a schematic diagram of a positioning method in a mobile network according to an embodiment of the present invention.

A time-to-live (TTL) value may be assigned to an RTK measurement value to determine a quantity of times that the RTK measurement value can be forwarded. As shown in FIG. 8, a TTL assigned to the RTK measurement value is 4. After the RTK measurement value is sent from a first base station 12 to a second base station 15, a "TTL-1" operation is performed on the TTL value, that is, the TTL is 3; after the RTK measurement value is forwarded by the second base station 15 to a second base station 17, a "TTL-1" operation is performed on the TTL value, that is, the TTL is 2; and so on. After the RTK measurement value is forwarded by a second base station 18 to a second base station 19, the TTL is 0, and in this case, the RTK measurement value is no longer forwarded.

Specially, if the second base station 15 or the second base station 17 is located in a coverage area of an RTK reference source of the first base station 12, the second base station 15 or the second base station 17 may determine a single-reference-station differential correction parameter according to the RTK measurement value, and the single-reference-station differential correction parameter still has relatively high precision for a mobile terminal in a serving cell of the second base station 15 or the second base station 17, and may be directly used. If the second base station 18 or the second base station 19 is located outside a coverage area of an RTK reference source of the first base station 12, the second base station 18 or the second base station 19 may receive RTK measurement values of multiple first base stations 12, and perform joint resolving to obtain a differential correction parameter with relatively high precision, for example, determine a VRS differential correction parameter by using a VRS method.

Figure 9:
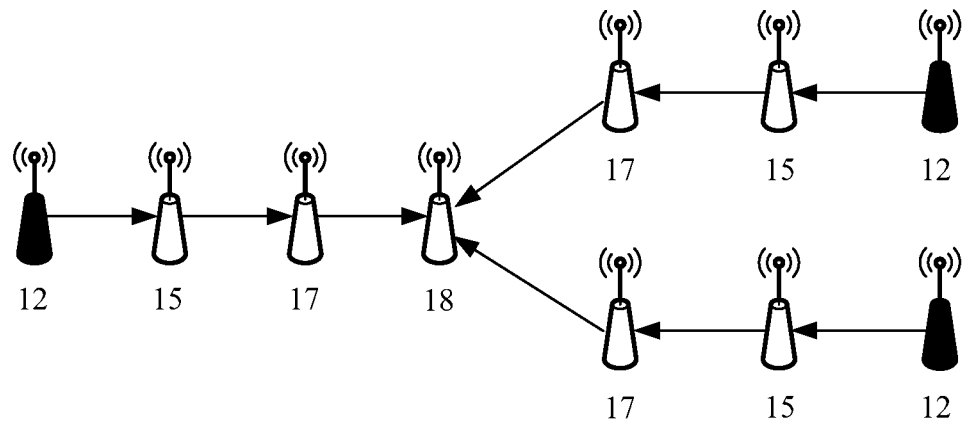
FIG. 9 is another schematic diagram of a positioning method in a mobile network according to an embodiment of the present invention.

For example, as shown in FIG. 9, a second base station 18 is located outside a coverage area of an RTK reference source of a first base station 12, and the second base station 18 receives RTK measurement values of at least three nearest first base stations 12. The second base station 18 performs joint resolving according to the received at least three RTK measurement values with reference to a location of the second base station 18, to obtain a VRS differential correction parameter. It should be understood that the second base station 18 is merely an example for description, and shall not constitute any limitation to the present invention, and any second base station can receive multiple RTK measurement values and obtain a VRS differential correction parameter by means of joint resolving by using the foregoing method.

Optionally, the second base station may also use a MAC technology to determine a MAC unit differential correction parameter (specific content of a MAC is described below in detail), so as to determine second correction information to be sent to the second mobile terminal.

It should be noted that the foregoing illustrated VRS method and MAC technology are merely examples for description, and shall not constitute any limitation to the present invention, and the present invention is not limited to these. Another positioning method for receiving, by a second base station, RTK measurement values of multiple first base stations and obtain second correction information by means of joint resolving shall fall within the protection scope of the present invention.

It should be further noted that the foregoing illustrated VRS method and MAC technology are positioning methods for performing joint resolving on multiple RTK measurement values, specific principles and resolving methods are different, but results obtained by means of resolving are both correction information of an RTCM format, and may both be used to position a second mobile terminal.

Therefore, according to the positioning method in this embodiment of the present invention, the first base station sends the RTK measurement value, and the second base station determines the second correction information according to the RTK measurement value, and sends the second correction information to the second mobile terminal, so that the second mobile terminal determines high-precision positioning information according to the second correction information, thereby meeting requirements of a large quantity of mobile users for high-precision positioning and reducing construction costs of the first base station. In addition, the method is flexible and convenient, and is easy to implement.

Case D

Optionally, the sending, by the first base station, the RTK measurement value, so that a second base station sends, to a second mobile terminal, second correction information determined according to the RTK measurement value, so that the second mobile terminal corrects, according to the second correction information, positioning information obtained by the second mobile terminal from the positioning system, so as to determine a location of the second mobile terminal includes:

sending, by the first base station, the RTK measurement value to a server, so that the server sends the second correction information to the second base station according to the RTK measurement value, so that the second base station sends the second correction information to the second mobile terminal, so that the second mobile terminal corrects, according to the second correction information, the positioning information obtained by the second mobile terminal from the positioning system, so as to determine the location of the second mobile terminal, where the second correction information is determined by the server according to the RTK measurement value.

Specifically, the Case D may be corresponding to the system architecture in FIG. 1 (*d*). The server may serve as a central station, and resolves all RTK measurement values from first base stations. The server selects a first base station near the second base station according to a location of the second base station, performs pertinent resolving to obtain high-precision second correction information for the second base station, and periodically sends the second correction information to the second base station. As an example instead of a limitation, the second correction information may be a MAC unit differential correction parameter or a VRS differential correction parameter.

Figure 10:
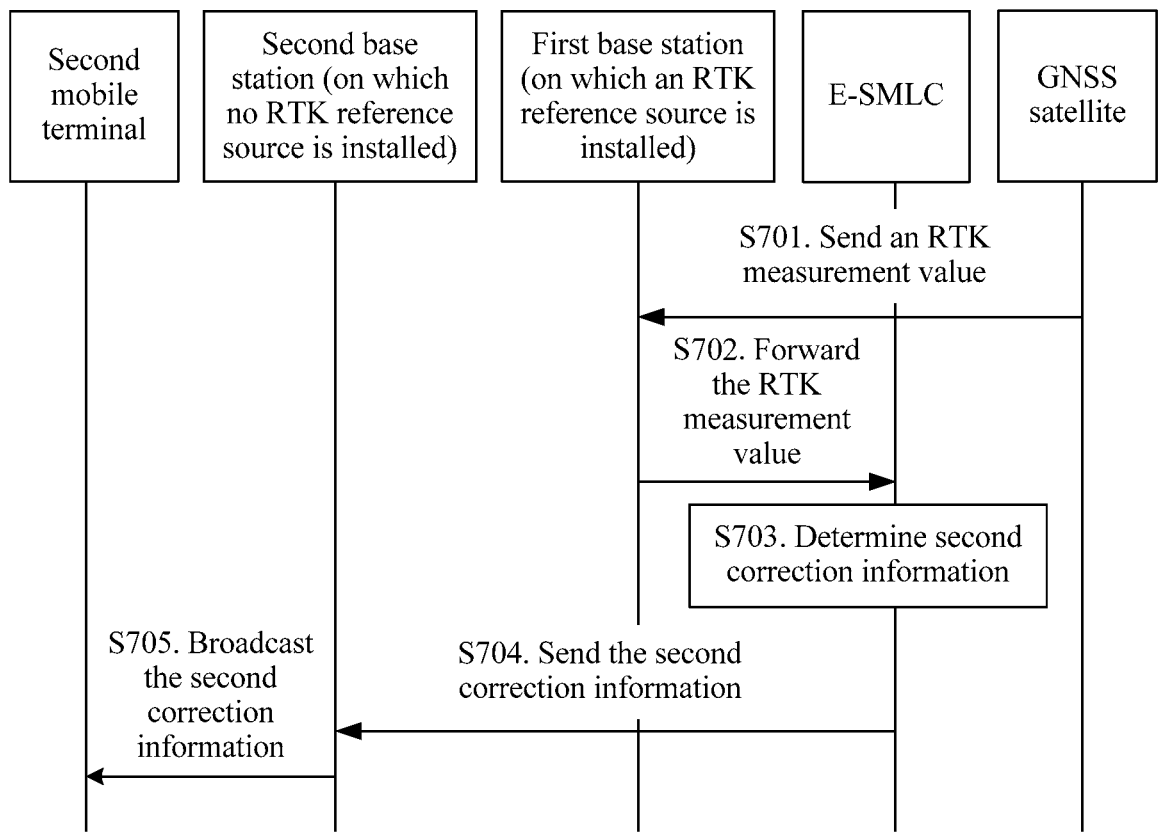
FIG. 10 is yet another schematic flowchart of a positioning method in a mobile network according to an embodiment of the present invention.

The following describes in detail a positioning method 700 in a mobile network according to an embodiment of the present invention with reference to FIG. 10 by using an example in which a first base station serves as a reference station, an E-SMLC serves as a central station, and a second base station serves as a floating station.

As shown in FIG. 10, the positioning method 700 includes:

S701. The first base station may serve as a reference station, and receive an RTK measurement value that is for an RTK reference source and that is sent by a GNSS satellite, where the RTK measurement value may be carried by an Ntrip message.

S702. The first base station forwards the RTK measurement value to the E-SMLC, where the RTK measurement value may be carried by a first LPPa message.

S703. The E-SMLC serves as a central station, performs resolving according to the received RTK measurement value, and determines second correction information (for example, a MAC unit differential correction parameter or a VRS differential correction parameter).

S704. The E-SMLC sends the second correction information to the second base station, where the second correction information may be carried by a second LPPa message.

S705. The second base station sends the second correction information to a second mobile terminal, where the second correction information may be sent to the second mobile terminal in a SIB broadcasting manner.

It should be noted that the first base station continuously receives an RTK measurement value sent by the GNSS satellite, and continuously reports the RTK measurement value to the E-SMLC, so that after determining second correction information according to the RTK measurement value, the E-SMLC can send the second correction information to the second base station at a specific frequency (for example, once per second), so as to update the second correction information in real time.

In this embodiment of the present invention, positioning methods for resolving, by the server, the RTK measurement value to obtain the second correction information mainly include a VRS method and a MAC technology, and respectively obtained two pieces of second correction information are a VRS differential correction parameter and a MAC unit differential correction parameter. The second base station sends the second correction information (for example, the VRS differential correction parameter and the MAC unit differential correction parameter) to the second mobile terminal, so that the second mobile terminal corrects positioning information from a GNSS according to the second correction information, so as to determine a location of the second mobile terminal. It should be understood that the foregoing illustrated resolving methods are merely examples for description, and a method for resolving the RTK measurement value by the server further includes an FKP method and the like. The present invention sets no special limitation thereto. Any method for receiving, by using a server, an RTK measurement value sent by a CORS central station and resolving the RTK measurement value to obtain correction information shall fall within the protection scope of the present invention.

It should be noted that the foregoing specific processes of resolving (for example, VRS and MAC) for the second base station belong to the prior art, and the present invention sets no limitation thereto. A method for resolving an RTK measurement value by the server is not limited thereto, and another positioning method for resolving an RTK measurement value shall fall within the protection scope of the present invention.

In this embodiment of the present invention, the server may send a first positioning certificate to the second base station, and send a second positioning certificate to the second mobile terminal. Specifically, after receiving a request for positioning the second mobile terminal, the server may first request a positioning capability from the second mobile terminal, to determine whether the second mobile terminal can normally receive a GNSS signal, whether the second mobile terminal supports GNSS carrier phase observation, whether the second mobile terminal has a high-precision positioning permission, and whether a function such as positioning/location reporting is enabled. When determining that the second mobile terminal meets the foregoing conditions, the server delivers the second positioning certificate to the second mobile terminal, so that the second mobile terminal obtains, according to the second positioning certificate, the second correction information sent by the second base station.

It should be noted that after receiving the correction information (including the first correction information and the second correction information), the mobile terminal (including the first mobile terminal and the second mobile terminal) may perform corresponding processing according to a type of the correction information. For example, the mobile terminal may determine a type of the correction information according to indication information carried in a message header of a message that carries the correction information, and then perform corresponding calculation and processing. For example, if the correction information is a VRS differential correction parameter, the mobile terminal may directly use the VRS differential correction parameter to correct positioning information from the GNSS; if the correction information is a MAC unit differential correction parameter, and the MAC unit differential correction parameter includes all measurement values of a master station and a differential correction parameter of an auxiliary station, the mobile terminal may resolve the MAC unit differential correction parameter to obtain a differential correction parameter used for positioning. It should be understood that a method for calculating and processing correction information by the mobile terminal is similar to a processing method of a floating station in the prior art, and the present invention sets no special limitation thereto.

Therefore, according to the positioning method in this embodiment of the present invention, the server determines the correction information according to the RTK measurement value sent by the first base station, and forwards the correction information to the mobile terminal by using the base station, so that the mobile terminal corrects, according to the correction information, the positioning information obtained by the mobile terminal from the positioning system, so as to determine high-precision positioning information for the mobile terminal, thereby meeting requirements of a large quantity of mobile users for high-precision positioning, and reducing workload of the base station and construction costs of the first base station. In addition, the method is flexible and convenient, and is easy to implement.

The foregoing describes in detail the positioning method in a mobile network according to the embodiments of the present invention with reference to FIG. 2 to FIG. 10 from the perspective of the first base station. The following describes in detail the positioning method in a mobile network according to the embodiments of the present invention with reference to FIG. 11 to FIG. 13 from a perspective of a server.

FIG. 11 shows a schematic flowchart of a positioning method 800 in a mobile network according to an embodiment of the present invention, where the positioning method 800 is described from a perspective of a server. As shown in FIG. 11, the positioning method 800 includes:

S810. The server receives a real-time kinematic RTK measurement value that is for an RTK reference source and sent by a first base station.

S820. The server determines first correction information according to the RTK measurement value, where the first correction information is correction information for positioning information obtained by the RTK reference source from a positioning system.

S830. The server sends the first correction information to a first base station, so that the first base station forwards the first correction information to the first mobile terminal, so that the first mobile terminal corrects, according to the first correction information, positioning information obtained by the first mobile terminal from the positioning system, so as to determine a location of the first mobile terminal.

Specifically, in this embodiment of the present invention, an RTK reference source is installed on a base station, and a server resolves an RTK measurement value to obtain correction information, to correct positioning information from a GNSS that uses a carrier phase technology, so as to obtain a more precise positioning result.

In this embodiment of the present invention, the RTK reference source is installed on the first base station, and therefore the first base station is a reference station in the E-NRTK positioning system; the server is a central station in the E-NRTK positioning system, and resolves the RTK measurement value sent by the first base station.

Therefore, according to the positioning method in this embodiment of the present invention, the server determines correction information for different base stations according to the RTK measurement value sent by the first base station, and sends the correction information to the base stations respectively, and the base stations send the correction information to mobile terminals, so that the mobile terminals obtain high-precision positioning information according to the correction information, thereby meeting requirements of a large quantity of mobile users for high-precision positioning. The method is flexible and convenient, and is easy to implement. In addition, the correction information for the first base station and correction information for a second base station are both determined by the server, which facilitates management and reduces workload of the base stations.

Optionally, that the server receives the RTK measurement value that is for the RTK reference source and sent by the first base station includes:

receiving, by the server, a first LPPa message sent by the first base station, where the first LPPa message carries the RTK measurement value.

That the server sends the first correction information to the first base station includes:

sending, by the server, a second LPPa message to the first base station, where the second LPPa message carries the first correction information.

In this embodiment of the present invention, a specific process in which the server determines the first correction information according to the RTK measurement value is similar to the specific process in the Case B in the foregoing method. For brevity, details are not described herein again.

Optionally, the first correction information includes a single-reference-station differential correction parameter.

That the server determines first correction information according to the RTK measurement value includes:

determining, by the server, the single-reference-station differential correction parameter according to the RTK measurement value.

That the server sends the first correction information to the first base station, so that the first base station forwards the first correction information to the first mobile terminal, so that the first mobile terminal corrects, according to the first correction information, positioning information obtained by the first mobile terminal from the positioning system, so as to determine a location of the first mobile terminal includes:

sending, by the server, the single-reference-station differential correction parameter to the first base station, so that the first base station forwards the single-reference-station differential correction parameter to the first mobile terminal, so that the first mobile terminal corrects, according to the single-reference-station differential correction parameter, the positioning information obtained by the first mobile terminal from the positioning system, so as to determine the location of the first mobile terminal.

Optionally, the positioning method 800 further includes:

determining, by the server, second correction information according to the RTK measurement value; and sending, by the server, the second correction information to a second base station, so that the second base station forwards the second correction information to a second mobile terminal, so that the second mobile terminal corrects, according to the second correction information, positioning information obtained by the second mobile terminal from the positioning system, so as to determine a location of the second mobile terminal.

Specifically, because a coverage area of the RTK reference source is larger than a coverage area of a base station, the first base station may be constructed according to a specific coverage ratio. A base station on which no RTK reference source is installed is a second base station. For example, the first base station may be planned and constructed according to specific spatial density, and a coverage area of the first base station may be ¼ of a coverage area of a MAC unit (the MAC unit is described in detail subsequently); or one or two first base stations are selected for each unit according to a MAC unit and with reference to a location of each base station to receive an RTK measurement value.

It should be noted that the foregoing illustrated specific method for determine a quantity of first base stations and spatial density is merely an example for description, and shall not constitute any limitation to the present invention, and the present invention is not limited to this.

Optionally, the second base station is located in a preset area of the first base station, and the second correction information includes a single-reference-station differential correction parameter.

The sending, by the server, the second correction information to a second base station, so that the second base station forwards the second correction information to a second mobile terminal, so that the second mobile terminal corrects, according to the second correction information, positioning information obtained by the second mobile terminal from the positioning system, so as to determine a location of the second mobile terminal includes:

sending, by the server, the single-reference-station differential correction parameter to the second base station, so that the second base station forwards the single-reference-station differential correction parameter to the second mobile terminal, so that the second mobile terminal corrects, according to the single-reference-station differential correction parameter, the positioning information obtained by the second mobile terminal from the positioning system, so as to determine the location of the second mobile terminal.

In this embodiment of the present invention, if a distance between the second base station and the first base station falls within a preset range, or if the second base station is located in a preset area of the first base station, or when the second base station is located in a coverage area of the RTK reference source, the second base station may directly determine the single-reference-station differential correction parameter according to the RTK measurement value. Although the single-reference-station differential correction parameter is correction information for the first base station (that is, the first correction information), because in the preset area, impact of using the single-reference-station differential correction parameter on positioning results of the second base station and the second mobile terminal is merely at a decimeter level, the single-reference-station differential correction parameter may be directly used as correction information for the second base station (that is, the second correction information).

By contrast, if a distance between the second base station and the first base station falls outside a preset range, the single-reference-station differential correction parameter cannot be used for high-precision positioning of the second base station and a second mobile terminal in a preset area of the second base station. Therefore, RTK measurement values of multiple first base stations need to be introduced for joint resolving, so as to improve precision of a positioning result.

The following separately describes in detail, by using a VRS method (Method 1) and a MAC method (Method 2) as examples, a specific process in which the server obtains the second correction information for the second base station.

Method 1

Optionally, the second correction information includes a virtual reference station VRS differential correction parameter.

The determining, by the server, second correction information according to the RTK measurement value includes:

determining, by the server, the VRS differential correction parameter according to at least two RTK measurement values sent by at least two target first base stations, where the at least two target first base stations are first base stations nearest the second base station, and each RTK measurement value is corresponding to one target first base station on which the RTK reference source is installed.

The sending, by the server, the second correction information to a second base station, so that the second base station forwards the second correction information to a second mobile terminal, so that the second mobile terminal corrects, according to the second correction information, positioning information obtained by the second mobile terminal from the positioning system, so as to determine a location of the second mobile terminal includes:

sending, by the server, the VRS differential correction parameter to the second base station, so that the second base station forwards the VRS differential correction parameter to the second mobile terminal, so that the second mobile terminal corrects, according to the VRS differential correction parameter, the positioning information obtained by the second mobile terminal from the positioning system, so as to determine the location of the second mobile terminal.

In this embodiment of the present invention, the second base station serves as a floating station, and reports a rough location of the second base station to the server (that is, an example of a central station); or the server prestores location information of all base stations (including the first base station and the second base station), and the location information indicates a location of the base station. The server constructs, in a virtualized manner according to the location of the second base station, a virtual reference station VRS having the same location as the second base station, selects RTK measurement values of at least three first base stations (that is, an example of a reference station) surrounding the second base station for resolving, and constructs a differential correction parameter for the virtual reference station VRS in a virtualized manner.

As shown in FIG. 12, the second base station 15 is surrounded by three first base stations 12. The server 14 determines a virtual reference station for a location of the second base station 15 according to location information of the second base station 15 and the first base station 12, performs joint resolving on RTK measurement values sent by the three first base stations 12 to obtain a VRS differential correction parameter for the virtual reference station, and sends the VRS differential correction parameter to the second base station 15, so that the second base station 15 determines the second correction information according to the VRS differential correction parameter.

It should be noted that the second base station 15 may be located in coverage areas of RTK reference sources of the three first base stations 12, or may be located outside coverage areas of RTK reference sources of the three first base stations 12. The present invention sets no special limitation thereto. When the second base station 15 is located in the coverage area of the RTK reference source of the first base station 12, the second correction information may be determined according to a single-reference-station differential correction parameter of the first base station, or the second correction information may be determined according to a VRS differential correction parameter that is determined by using RTK measurement values of multiple (at least two) first base stations.

It should be further noted that RTK measurement values of at least two first base stations, that is, at least two RTK measurement values, are needed to perform joint resolving in the VRS method, and a used VRS algorithm varies with a quantity of RTK measurement values. For example, a hyperbola method is used when two RTK measurement values are resolved; a triangle method is used when three RTK measurement values are resolved. The present invention sets no special limitation to a method for resolving an RTK measurement value.

Method 2

Optionally, the second correction information includes a master-auxiliary concept MAC unit differential correction parameter.

The determining, by the server, second correction information according to the RTK measurement value includes:

determining, by the server, the MAC unit differential correction parameter according to at least two RTK measurement values sent by at least two target first base stations, where the at least two target first base stations and the second base station belong to a same target MAC unit, and each RTK measurement value is corresponding to one target first base station on which the RTK reference source is installed.

The sending, by the server, the second correction information to a second base station, so that the second base station forwards the second correction information to a second mobile terminal, so that the second mobile terminal corrects, according to the second correction information, positioning information obtained by the second mobile terminal from the positioning system, so as to determine a location of the second mobile terminal includes:

sending, by the server, the MAC unit differential correction parameter to the second base station, so that the second base station forwards the MAC unit differential correction parameter to the second mobile terminal, so that the second mobile terminal corrects, according to the MAC unit differential correction parameter, the positioning information obtained by the second mobile terminal from the positioning system, so as to determine the location of the second mobile terminal.

In this embodiment of the present invention, an entire GNSS reference station network is divided into multiple MAC units in advance, each MAC unit includes at least two reference stations (that is, first base stations), one reference station is selected as a master station of the MAC unit, and the other reference station is an auxiliary station. A cell reference value packet, that is, a MAC unit differential correction parameter, is generated by using whole-cycle reference values of the master station as a center and with reference to a reference value of the auxiliary station.

Figure 13:
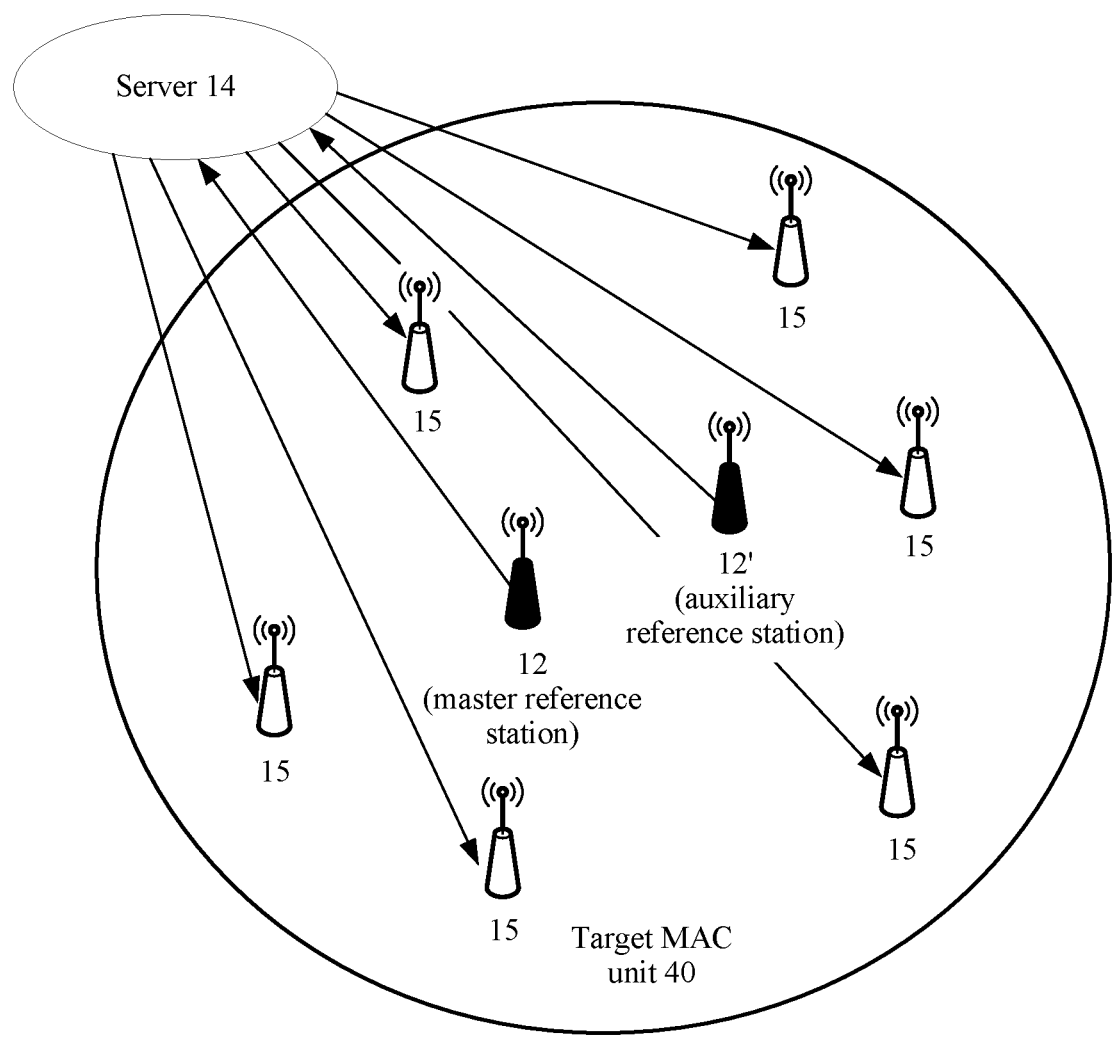
FIG. 13 is another schematic diagram of a positioning method in a mobile network according to another embodiment of the present invention.

As shown in FIG. 13, a server 14 determines, according to a rough location of a second base station 15 that is reported by the second base station 15, a MAC unit in which the second base station is located, that is, a target MAC unit 40. The target MAC unit 40 includes at least two first base stations 12, that is, target first base stations, one of which is a master reference station 12, and the rest is an auxiliary reference station 12'. The server 14 processes RTK measurement values sent by the master reference station 12 and the auxiliary reference station 12', to generate a MAC unit differential correction parameter, and sends the MAC unit differential correction parameter to the second base station 15. After receiving the MAC unit differential correction parameter, the second base station 15 sends the MAC unit differential correction parameter to a second mobile terminal. The second mobile terminal performs resolving processing on the MAC unit differential correction parameter, so as to obtain correction information of the same format as the foregoing single-reference-station differential correction parameter or VRS differential correction parameter.

It should be noted that, different from the VRS method, in the MAC technology, a central station determines a unit correction parameter that includes all measurement values of the master reference station and a differential correction parameter of the auxiliary reference station, and therefore, a floating station needs to resolve the MAC unit differential correction parameter to obtain final correction information used for positioning.

It should be further noted that the foregoing illustrated VRS method and MAC technology are used to determine correction information for a second base station that is located outside a preset area of a first base station, are merely examples for description, and shall not constitute any limitation to the present invention. When the second base station is located in the preset area of the first base station, the foregoing methods may also be used to determine the correction information for the second base station more precisely.

It should be further noted that the foregoing VRS method and MAC technology are merely examples for description, and in a different mobile network, a positioning method matching the mobile network may be selected and used according to a precision requirement, an algorithm supported by a floating station (including a second base station and a mobile terminal). The present invention sets no special limitation thereto.

It should be noted that a SIB message (including the first SIB message and the second SIB message) used to carry the correction information (including the first correction information and the second correction information) is merely an example for description, and shall not constitute any limitation to the present invention, and the present invention is not limited to this. Another message used to carry the correction information shall fall within the protection scope of the present invention.

Optionally, the method 800 further includes:

sending, by the server, a first positioning certificate to each of the first base station and the second base station; and sending, by the server, a second positioning certificate to the mobile terminal, where the second positioning certificate is corresponding to the first positioning certificate, so that the first mobile terminal obtains the first correction information from the first base station according to the second positioning certificate, or the second mobile terminal obtains the second correction information from the second base station according to the second positioning certificate.

Optionally, the sending, by the server, a first positioning certificate to each of the first base station and the second base station includes:

sending, by the server, a third LPPa message to each of the first base station and the second base station, where the third LPPa message carries the first positioning certificate.

The sending, by the server, a second positioning certificate to the mobile terminal includes:

sending, by the server, an LTE positioning protocol LPP message to the mobile terminal, where the LPP message carries the second positioning certificate.

In the positioning method 800, a specific process in which the server sends the first positioning certificate to a base station (including the first base station and the second base station) and sends the second positioning certificate to a mobile terminal (including the first mobile terminal and the second mobile terminal) is similar to the specific process in the foregoing method 500. For brevity, details are not described herein again.

Therefore, according to the positioning method in this embodiment of the present invention, correction information for different base stations is determined according to the RTK measurement value sent by the first base station, and the correction information is sent to the base stations respectively, and the base stations send the correction information to mobile terminals, so that the mobile terminals obtain high-precision positioning information according to the correction information, thereby meeting requirements of a large quantity of mobile users for high-precision positioning. The method is flexible and convenient, and is easy to implement. In addition, the correction information for the first base station and the correction information for the second base station are both managed by the server, which facilitates management.

The foregoing describes in detail the positioning method in a mobile network according to the embodiments of the present invention with reference to FIG. 10 to FIG. 13 from the perspective of the server. The following describes in detail the positioning method in a mobile network according to the embodiments of the present invention with reference to FIG. 14 from a perspective of a second base station.

FIG. 14 shows a schematic flowchart of a positioning method 900 in a mobile network according to an embodiment of the present invention, where the positioning method 900 is described from a perspective of a second base station. As shown in FIG. 14, the positioning method 900 includes:

S910. The second base station obtains second correction information, where the second correction information is determined according to a real-time kinematic RTK measurement value for an RTK reference source installed on a first base station, and the RTK reference source is not installed on the second base station.

S920. The second base station sends the second correction information to a second mobile terminal, so that the second mobile terminal corrects, according to the second correction information, positioning information obtained by the second mobile terminal from a positioning system, so as to determine a location of the second mobile terminal.

Optionally, that the second base station obtains second correction information, where the second correction information is determined according to an RTK measurement value for an RTK reference source installed on a first base station includes:

receiving, by the second base station, the RTK measurement value sent by the first base station, where the RTK reference source is installed on the first base station; and determining, by the second base station, the second correction information according to the RTK measurement value.

Optionally, the receiving, by the second base station, the RTK measurement value sent by the first base station, where the second correction information is determined according to the RTK measurement value for the RTK reference source installed on the first base station includes:

receiving, by the second base station, the RTK measurement value that is sent by the first base station and forwarded by using N forward base stations, where N is determined according to a time-to-live value of the RTK measurement value, and the RTK reference source is not installed on the forward base stations; and determining, by the second base station, the second correction information according to the RTK measurement value.

Optionally, a distance between the second base station and the first base station falls within a preset range, and the second correction information includes a single-reference-station differential correction parameter.

That the second base station obtains second correction information, where the second correction information is determined according to an RTK measurement value for an RTK reference source installed on a first base station includes:

receiving, by the second base station, the RTK measurement value sent by the first base station, where the RTK reference source is installed on the first base station; and determining, by the second base station, the single-reference-station differential correction parameter according to the RTK measurement value.

That the second base station sends the second correction information to the second mobile terminal, so that the second mobile terminal corrects, according to the second correction information, positioning information obtained by the second mobile terminal from a positioning system, so as to determine a location of the second mobile terminal includes:

sending, by the second base station, the single-reference-station differential correction parameter to the second mobile terminal, so that the second mobile terminal corrects, according to the single-reference-station differential correction parameter, the positioning information obtained by the second mobile terminal from the positioning system, so as to determine the location of the second mobile terminal.

Optionally, the second correction information includes a virtual reference station VRS differential correction parameter.

That the second base station obtains second correction information, where the second correction information is determined according to an RTK measurement value for an RTK reference source installed on a first base station includes:

receiving, by the second base station, at least two RTK measurement values sent by at least two first base stations, where each RTK measurement value is corresponding to one first base station on which the RTK reference source is installed; and determining, by the second base station, the VRS differential correction parameter according to the at least two RTK measurement values sent by the at least two first base stations.

That the second base station sends the second correction information to the second mobile terminal, so that the second mobile terminal corrects, according to the second correction information, positioning information obtained by the second mobile terminal from a positioning system, so as to determine a location of the second mobile terminal includes:

sending, by the second base station, the VRS differential correction parameter to the second mobile terminal, so that the second mobile terminal corrects, according to the VRS differential correction parameter, the positioning information obtained by the second mobile terminal from the positioning system, so as to determine the location of the second mobile terminal.

Optionally, the second correction information includes a master-auxiliary concept MAC unit differential correction parameter.

That the second base station obtains second correction information, where the second correction information is determined according to a real-time kinematic RTK measurement value for an RTK reference source installed on a first base station includes:

receiving, by the second base station, at least two target RTK measurement values sent by at least two target first base stations, where the second base station and the target first base stations belong to a same target MAC unit, and each RTK measurement value is corresponding to one target first base station on which the RTK reference source is installed; and determining, by the second base station, the MAC unit differential correction parameter according to the at least two target RTK measurement values.

That the second base station sends the second correction information to the second mobile terminal, so that the second mobile terminal corrects, according to the second correction information, positioning information obtained by the second mobile terminal from a positioning system, so as to determine a location of the second mobile terminal includes:

sending, by the second base station, the MAC unit differential correction parameter to the second mobile terminal, so that the second mobile terminal corrects, according to the MAC unit differential correction parameter, the positioning information obtained by the second mobile terminal from the positioning system, so as to determine the location of the second mobile terminal.

Optionally, that the second base station obtains second correction information, where the second correction information is determined according to an RTK measurement value for an RTK reference source installed on a first base station includes:

receiving, by the second base station, the second correction information sent by a server, where the second correction information is determined according to the RTK measurement value that is for the RTK reference source and sent by the first base station.

Optionally, that the second base station sends the second correction information to the second mobile terminal, so that the second mobile terminal corrects, according to the second correction information, positioning information obtained by the second mobile terminal from a positioning system, so as to determine a location of the second mobile terminal includes:

sending, by the second base station, a cell broadcast message, where the cell broadcast message carries the second correction information, so that the second mobile terminal corrects, according to the second correction information, the positioning information obtained by the second mobile terminal from the positioning system, so as to determine the location of the first mobile terminal.

Optionally, the cell broadcast message includes a second system information block SIB message.

Optionally, the receiving, by the second base station, the second correction information sent by a server includes:

receiving, by the second base station, a second LPPa message sent by the server, where the second LPPa message carries the second correction information.

Optionally, the method 900 further includes:

receiving, by the second base station, a first positioning certificate sent by the server, where the first positioning certificate is corresponding to a second positioning certificate sent by the server to the second mobile terminal, so that the second mobile terminal obtains the second correction information from the second base station according to the second positioning certificate.

Optionally, the receiving, by the second base station, a first positioning certificate sent by the server includes:

receiving, by the second base station, a third LPPa message sent by the server, where the third LPPa message carries the first positioning certificate.

In the positioning method 900, a specific process in which the second base station obtains the second correction information is similar to the specific processes in the methods in FIG. 2 to FIG. 13. For brevity, details are not described herein.

Therefore, according to the positioning method in this embodiment of the present invention, the first base station sends the RTK measurement value, and the second base station determines the second correction information according to the RTK measurement value, or receives the second correction information from the server, and sends the second correction information to the second mobile terminal, so that the second mobile terminal determines high-precision positioning information according to the second correction information, thereby meeting requirements of a large quantity of mobile users for high-precision positioning and reducing construction costs of the first base station. In addition, the method is flexible and convenient, and is easy to implement.

The foregoing describes in detail the positioning method in a mobile network according to the embodiments of the present invention with reference to FIG. 14 from the perspective of the second base station. The following describes in detail the positioning method in a mobile network according to the embodiments of the present invention with reference to FIG. 15 from a perspective of a mobile terminal.

FIG. 15 shows a schematic flowchart of a positioning method 1000 in a mobile network according to an embodiment of the present invention, where the positioning method 1000 is described from a perspective of a mobile terminal. As shown in FIG. 15, the positioning method 1000 includes:

S1100. The mobile terminal obtains positioning information for the mobile terminal from a positioning system.

S1200. The mobile terminal receives correction information sent by a base station, where the correction information is determined according to a real-time kinematic RTK measurement value.

S1300. The mobile terminal corrects the positioning information according to the correction information, so as to determine a location of the mobile terminal.

In the method 1000, actions of the mobile terminal are similar to the actions of mobile terminals (including the first mobile terminal and the second mobile terminal) in the methods in FIG. 2 to FIG. 14. To avoid repetition, details are omitted.

Therefore, according to the positioning method in a mobile network in this embodiment of the present invention, the mobile terminal receives the correction information from the base station, and corrects the positioning information obtained by the mobile terminal from the positioning system, so as to determine high-precision positioning information for the mobile terminal, thereby meeting requirements of a large quantity of mobile users for high-precision positioning.

The foregoing describes in detail the positioning method in a mobile network according to the embodiments of the present invention with reference to FIG. 1 to FIG. 15. The following describes in detail a positioning base station, a server, and a mobile terminal in a mobile network according to the embodiments of the present invention with reference to FIG. 16 to FIG. 25.

Figure 16:
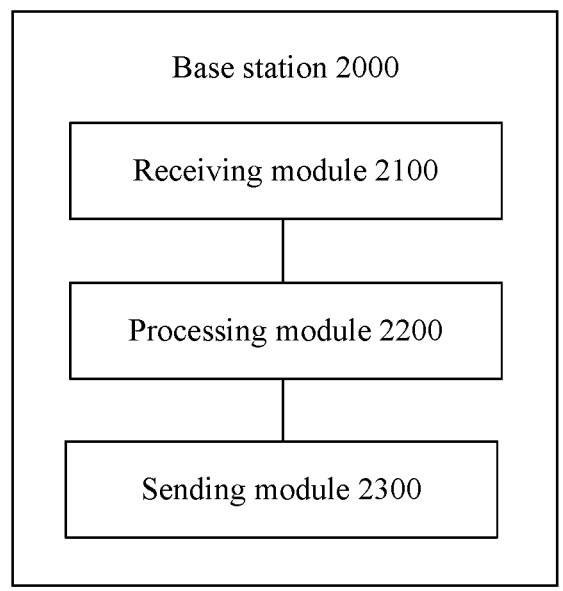
FIG. 16 is a schematic block diagram of a base station according to an embodiment of the present invention.

FIG. 16 shows a schematic block diagram of a base station 2000 according to an embodiment of the present invention. As shown in FIG. 16, the base station 2000 includes:

a receiving module 2100, configured to receive a real-time kinematic RTK measurement value for an RTK reference source;

a processing module 2200, configured to determine first correction information according to the RTK measurement value, where the first correction information is correction information for positioning information obtained by the RTK reference source from a positioning system; and a sending module 2300, configured to send the first correction information to a first mobile terminal, so that the first mobile terminal corrects, according to the first correction information, positioning information obtained by the first mobile terminal from the positioning system, so as to determine a location of the first mobile terminal.

Optionally, the RTK reference source is installed on the base station.

Optionally, the first correction information includes a single-reference-station differential correction parameter.

The processing module 2200 is specifically configured to determine the single-reference-station differential correction parameter according to the RTK measurement value.

The sending module 2300 is specifically configured to send the single-reference-station differential correction parameter to the first mobile terminal, so that the first mobile terminal corrects, according to the single-reference-station differential correction parameter, the positioning information obtained by the first mobile terminal from the positioning system, so as to determine the location of the first mobile terminal.

Optionally, the sending module 2200 is specifically configured to send a cell broadcast message, where the cell broadcast message carries the first correction information, so that the first mobile terminal corrects, according to the first correction information, the positioning information obtained by the first mobile terminal from the positioning system, so as to determine the location of the first mobile terminal.

Optionally, the cell broadcast message includes a first system information block SIB message.

Optionally, the sending module 2200 is further configured to send the RTK measurement value, so that a second base station sends, to a second mobile terminal, second correction information determined according to the RTK measurement value, so that the second mobile terminal corrects, according to the second correction information, positioning information obtained by the second mobile terminal from the positioning system, so as to determine a location of the second mobile terminal, where the RTK reference source is not installed on the second base station.

Optionally, the sending module 2200 is specifically configured to send the RTK measurement value to the second base station by using N forward base stations, so that the second base station sends the second correction information to the second mobile terminal, so that the second mobile terminal corrects, according to the second correction information, the positioning information obtained by the second mobile terminal from the positioning system, so as to determine the location of the second mobile terminal, where N is determined according to a time-to-live value of the RTK measurement value, the RTK reference source is not installed on the forward base stations, and the second correction information is determined by the second base station according to the RTK measurement value.

The base station 2000 according to this embodiment of the present invention may be corresponding to a first base station in a positioning method in a mobile network according to an embodiment of the present invention, and the foregoing and other operations and/or functions of modules in the base station 2000 are respectively intended to implement corresponding processes of the methods in FIG. 2, FIG. 3, and FIG. 5 to FIG. 9. For brevity, details are not described herein again.

Therefore, the base station in this embodiment of the present invention is provided with the RTK reference source, determines the correction information according to the RTK measurement value, and sends the correction information to the mobile terminal, so that the mobile terminal obtains high-precision positioning information according to the correction information, thereby meeting requirements of a large quantity of mobile users for high-precision positioning. In addition, the base station is flexible and convenient, and is easy to implement.

Figure 17:
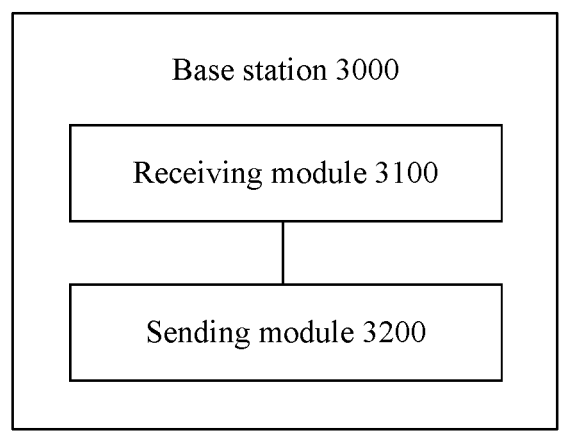
FIG. 17 is a schematic block diagram of another base station according to an embodiment of the present invention.

FIG. 17 shows a schematic block diagram of a base station 3000 according to an embodiment of the present invention. As shown in FIG. 17, the base station 3000 includes:

a receiving module 3100, configured to receive a real-time kinematic RTK measurement value for an RTK reference source; and a sending module 3200, configured to send the RTK measurement value to a server; where the receiving module 3100 is further configured to receive first correction information sent by the server, where the first correction information is determined by the server according to the RTK measurement value; and the sending module 3200 is further configured to send the first correction information to a first mobile terminal, so that the first mobile terminal corrects, according to the first correction information, positioning information obtained by the first mobile terminal from a positioning system, so as to determine a location of the first mobile terminal.

Optionally, the RTK reference source is installed on the base station 3000.

The base station 3000 according to this embodiment of the present invention may be corresponding to a first base station in a positioning method in a mobile network according to an embodiment of the present invention, and the foregoing and other operations and/or functions of modules in the base station 3000 are respectively intended to implement corresponding processes of the positioning methods in FIG. 4 and FIG. 10. For brevity, details are not described herein again.

Therefore, according to the base station in this embodiment of the present invention, the server determines the correction information according to the RTK measurement value sent by the base station, and forwards the correction information to the mobile terminal by using the base station, so that the mobile terminal obtains high-precision positioning information according to the correction information, thereby meeting requirements of a large quantity of mobile users for high-precision positioning and reducing workload of the base station.

Figure 18:
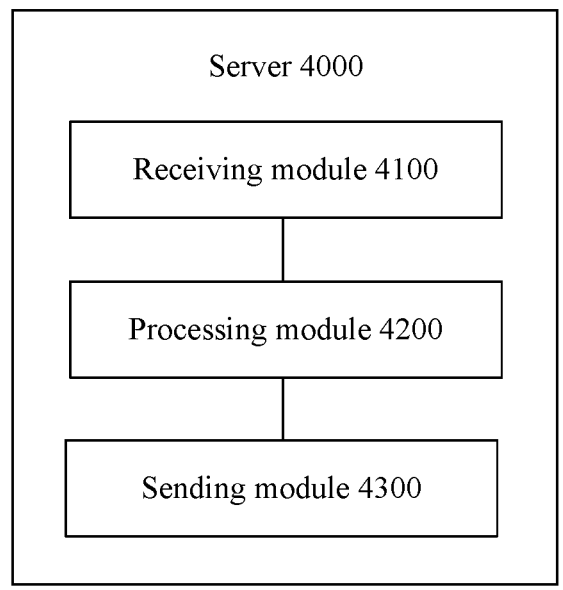
FIG. 18 is a schematic block diagram of a server according to an embodiment of the present invention.

FIG. 18 shows a schematic block diagram of a server 4000 according to an embodiment of the present invention. As shown in FIG. 18, the server 4000 includes:

a receiving module 4100, configured to receive a real-time kinematic RTK measurement value that is for an RTK reference source and sent by a first base station;

a processing module 4200, configured to determine first correction information according to the RTK measurement value; and a sending module 4300, configured to send the first correction information to the first base station, so that the first base station forwards the first correction information to the first mobile terminal, so that the first mobile terminal corrects, according to the first correction information, positioning information obtained by the first mobile terminal from a positioning system, so as to determine a location of the first mobile terminal.

Optionally, the first correction information includes a single-reference-station differential correction parameter.

The processing module 4200 is specifically configured to determine the single-reference-station differential correction parameter according to the RTK measurement value.

The sending module 4300 is specifically configured to send the single-reference-station differential correction parameter to the first base station, so that the first base station forwards the single-reference-station differential correction parameter to the first mobile terminal, so that the first mobile terminal corrects, according to the single-reference-station differential correction parameter, the positioning information obtained by the first mobile terminal from the positioning system, so as to determine the location of the first mobile terminal.

Optionally, the processing module 4200 is further configured to determine second correction information according to the RTK measurement value.

The sending module 4300 is further configured to send the second correction information to a second base station, so that the second base station forwards the second correction information to a second mobile terminal, so that the second mobile terminal corrects, according to the second correction information, positioning information obtained by the second mobile terminal from the positioning system, so as to determine a location of the second mobile terminal.

Optionally, a distance between the second base station and the first base station falls within a preset range, and the second correction information includes a single-reference-station differential correction parameter.

The sending module 4300 is specifically configured to send the single-reference-station differential correction parameter to the second base station, so that the second base station forwards the single-reference-station differential correction parameter to the second mobile terminal, so that the second mobile terminal corrects, according to the single-reference-station differential correction parameter, the positioning information obtained by the second mobile terminal from the positioning system, so as to determine the location of the second mobile terminal.

Optionally, the second correction information includes a virtual reference station VRS differential correction parameter.

The processing module 4200 is specifically configured to: determine, according to a location of the second base station, at least two target first base stations nearest the second base station, and determine the VRS differential correction parameter according to at least two RTK measurement values sent by the at least two target first base stations, where each RTK measurement value is corresponding to one target first base station on which the RTK reference source is installed.

The sending module 4300 is specifically configured to send the VRS differential correction parameter to the second base station, so that the second base station forwards the VRS differential correction parameter to the second mobile terminal, so that the second mobile terminal corrects, according to the VRS differential correction parameter, the positioning information obtained by the second mobile terminal from the positioning system, so as to determine the location of the second mobile terminal.

Optionally, the second correction information includes a MAC unit differential correction parameter.

The processing module 4200 is specifically configured to: determine, according to a location of the second base station, a target MAC unit to which the second base station belongs, and determine the MAC unit differential correction parameter according to at least two RTK measurement values sent by at least two target first base stations in the target MAC unit, where each RTK measurement value is corresponding to one target first base station on which the RTK reference source is installed.

The sending module 4300 is specifically configured to send the MAC unit differential correction parameter to the second base station, so that the second base station forwards the MAC unit differential correction parameter to the second mobile terminal, so that the second mobile terminal corrects, according to the MAC unit differential correction parameter, the positioning information obtained by the second mobile terminal from the positioning system, so as to determine the location of the second mobile terminal.

The server 4000 according to this embodiment of the present invention may be corresponding to a server in a positioning method in a mobile network according to an embodiment of the present invention, and the foregoing and other operations and/or functions of modules in the server 4000 are respectively intended to implement corresponding processes of the methods in FIG. 2 to FIG. 14. For brevity, details are not described herein again.

Therefore, the server in this embodiment of the present invention determines correction information for different base stations according to the RTK measurement value sent by the first base station, and send the correction information to the base stations respectively, and the base stations send the correction information to mobile terminals, so that the mobile terminals obtain high-precision positioning information according to the correction information, thereby meeting requirements of a large quantity of mobile users for high-precision positioning. The server is flexible and convenient, and is easy to implement. In addition, the correction information for the first base station and the correction information for the second base station are both managed by the server, which facilitates management.

Figure 19:
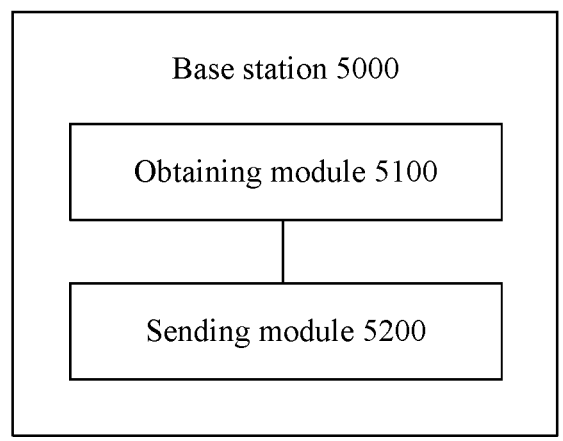
FIG. 19 is a schematic block diagram of still another base station according to an embodiment of the present invention.

FIG. 19 shows a schematic block diagram of another base station 5000 according to an embodiment of the present invention. No real-time kinematic RTK reference source is installed on the base station 5000. As shown in FIG. 19, the base station 5000 includes:

an obtaining module 5100, configured to obtain second correction information, where the second correction information is determined according to an RTK measurement value for the RTK reference source installed on a first base station;

a sending module 5200, configured to send the second correction information to a second mobile terminal, so that the second mobile terminal corrects, according to the second correction information, positioning information obtained by the second mobile terminal from a positioning system, so as to determine a location of the second mobile terminal.

Optionally, the obtaining module 5100 includes:

a receiving unit, configured to receive the RTK measurement value sent by the first base station; and a determining unit, configured to determine the second correction information according to the RTK measurement value received by the receiving unit.

Optionally, the receiving unit is specifically configured to receive the RTK measurement value that is sent by the first base station and forwarded by using N forward base stations, where N is determined according to a time-to-live value of the RTK measurement value, and the RTK reference source is not installed on the forward base stations.

Optionally, a distance between the base station 5000 and the first base station falls within a preset range, and the second correction information includes a single-reference-station differential correction parameter.

The sending module 5200 is specifically configured to send the single-reference-station differential correction parameter to the second mobile terminal, so that the second mobile terminal corrects, according to the single-reference-station differential correction parameter, the positioning information obtained by the second mobile terminal from the positioning system, so as to determine the location of the second mobile terminal.

Optionally, the second correction information includes a virtual reference station VRS differential correction parameter.

The receiving unit is specifically configured to receive at least two RTK measurement values sent by at least two first base stations, where each RTK measurement value is corresponding to one first base station on which the RTK reference source is installed.

The determining unit is specifically configured to determine the VRS differential correction parameter according to the at least two RTK measurement values received by the receiving unit.

The sending module 5200 is specifically configured to send the VRS differential correction parameter to the second mobile terminal, so that the second mobile terminal corrects, according to the VRS differential correction parameter, the positioning information obtained by the second mobile terminal from the positioning system, so as to determine the location of the second mobile terminal.

Optionally, the second correction information includes a master-auxiliary concept MAC unit differential correction parameter.

The receiving unit is specifically configured to receive at least two target RTK measurement values sent by at least two target first base stations, where the base station 5000 and the at least two target first base stations belong to a same target MAC unit, and each RTK measurement value is corresponding to one target first base station on which the RTK reference source is installed.

The determining unit is specifically configured to determine the MAC unit differential correction parameter according to the target RTK measurement values.

The sending module 5200 is specifically configured to send the MAC unit differential correction parameter to the second mobile terminal, so that the second mobile terminal corrects, according to the MAC unit differential correction parameter, the positioning information obtained by the second mobile terminal from the positioning system, so as to determine the location of the second mobile terminal.

Optionally, the receiving unit is further configured to receive the second correction information sent by the server, where the second correction information is determined by the server according to the RTK measurement value sent by the first base station.

Optionally, the sending module 5200 is specifically configured to send a cell broadcast message, where the cell broadcast message carries the second correction information, so that the second mobile terminal corrects, according to the second correction information, the positioning information obtained by the second mobile terminal from the positioning system, so as to determine the location of the second mobile terminal.

Optionally, the cell broadcast message includes a second system information block SIB message.

The base station 5000 according to this embodiment of the present invention may be corresponding to a second base station in a positioning method in a mobile network according to an embodiment of the present invention, and the foregoing and other operations and/or functions of modules in the base station 5000 are respectively intended to implement corresponding processes of the methods in FIG. 6 to FIG. 10, and FIG. 12 to FIG. 15. For brevity, details are not described herein again.

Therefore, the base station in this embodiment of the present invention receives the RTK measurement value from the first base station, and determines the second correction information, or receives the second correction information from the server, and sends the second correction information to the second mobile terminal, so that the second mobile terminal determines high-precision positioning information according to the second correction information, thereby meeting requirements of a large quantity of mobile users for high-precision positioning and reducing construction costs of the first base station. In addition, the base station is flexible and convenient, and is easy to implement.

Figure 20:
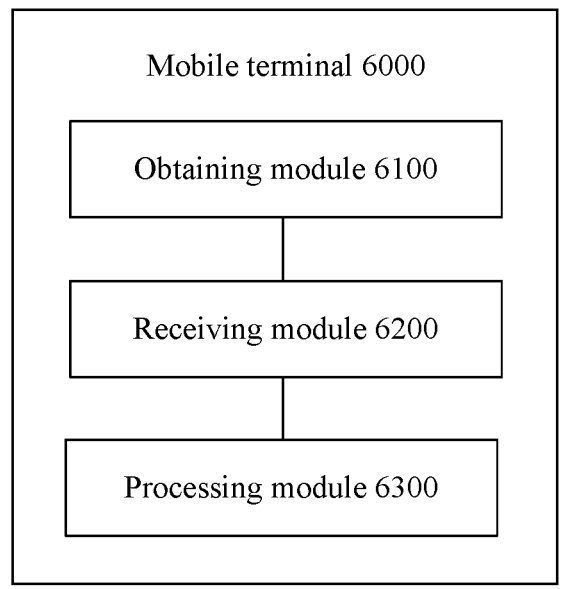
FIG. 20 is a schematic block diagram of a mobile terminal according to an embodiment of the present invention.

FIG. 20 shows a schematic block diagram of a mobile terminal 6000 according to an embodiment of the present invention. As shown in FIG. 20, the mobile terminal 6000 includes:

an obtaining module 6100, configured to obtain positioning information for the mobile terminal 6000 from a positioning system;

a receiving module 6200, configured to receive correction information sent by a base station, where the correction information is determined according to a real-time kinematic RTK measurement value; and a processing module 6300, configured to correct, according to the correction information received by the receiving module 6200, the positioning information obtained by the obtaining module 6100, so as to determine a location of the mobile terminal.

The mobile terminal 6000 according to this embodiment of the present invention may be corresponding to a mobile terminal in a positioning method in a mobile network according to an embodiment of the present invention, and the foregoing and other operations and/or functions of modules in the mobile terminal 6000 are respectively intended to implement corresponding processes of the methods in FIG. 2 to FIG. 15. For brevity, details are not described herein again.

Therefore, the mobile terminal in this embodiment of the present invention receives the correction information from the base station, and corrects the positioning information obtained from the positioning system, so as to determine high-precision positioning information for the mobile terminal, thereby meeting requirements of a large quantity of mobile users for high-precision positioning.

Figure 21:
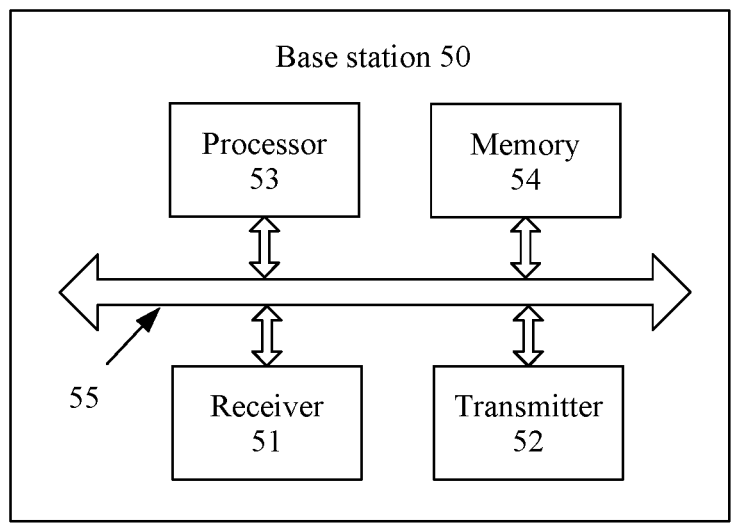
FIG. 21 is a schematic block diagram of a base station according to another embodiment of the present invention.

FIG. 21 shows a schematic block diagram of a base station 50 according to another embodiment of the present invention. As shown in FIG. 21, the base station 50 includes a receiver 51, a transmitter 52, a processor 53, a memory 54, and a bus system 55. The receiver 51, the transmitter 52, the processor 53, and the memory 54 are connected by using the bus system 55. The memory 54 is configured to store an instruction. The processor 53 is configured to execute the instruction stored in the memory 54, to control the receiver 51 to receive a signal and control the transmitter 52 to send a signal.

The receiver 51 is configured to receive a real-time kinematic RTK measurement value for an RTK reference source.

The processor 53 is configured to determine first correction information according to the RTK measurement value, where the first correction information is correction information for positioning information obtained by the RTK reference source from a positioning system.

The transmitter 52 is configured to send, to a first mobile terminal, the first correction information determined according to the RTK measurement value, so that the first mobile terminal corrects, according to the first correction information, positioning information obtained by the first mobile terminal from the positioning system, so as to determine a location of the first mobile terminal.

Optionally, the first correction information includes a single-reference-station differential correction parameter.

The processor 53 is further configured to determine the single-reference-station differential correction parameter according to the RTK measurement value.

The transmitter 52 is specifically configured to send the single-reference-station differential correction parameter to the first mobile terminal, so that the first base station sends the single-reference-station differential correction parameter to the first mobile terminal, so that the first mobile terminal corrects, according to the single-reference-station differential correction parameter, the positioning information obtained by the first mobile terminal from the positioning system, so as to determine the location of the first mobile terminal.

Optionally, the transmitter 52 is specifically configured to send a cell broadcast message, where the cell broadcast message carries the first correction information, so that the first mobile terminal corrects, according to the first correction information, the positioning information obtained by the first mobile terminal from the positioning system, so as to determine the location of the first mobile terminal.

Optionally, the cell broadcast message includes a first system information block SIB message.

Optionally, the transmitter 52 is further configured to send the RTK measurement value, so that a second base station sends, to a second mobile terminal, second correction information determined according to the RTK measurement value, so that the second mobile terminal corrects, according to the second correction information, positioning information obtained by the second mobile terminal from the positioning system, so as to determine a location of the second mobile terminal, where the RTK reference source is not installed on the second base station 1.

Optionally, the transmitter 52 is specifically configured to send the RTK measurement value to the second base station by using N forward base stations, so that the second base station sends the second correction information to the second mobile terminal, so that the second mobile terminal corrects, according to the second correction information, the positioning information obtained by the second mobile terminal from the positioning system, so as to determine the location of the second mobile terminal, where N is determined according to a time-to-live value of the RTK measurement value, the RTK reference source is not installed on the forward base stations, and the second correction information is determined by the second base station according to the RTK measurement value.

It should be understood that in this embodiment of the present invention, the processor 53 may be a central processing unit (CPU), or the processor 53 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may also be any conventional processor or the like.

The memory 54 may include a read-only memory and a random access memory, and provide an instruction and data to the processor 53. A part of the memory 54 may further include a non-volatile random access memory. For example, the memory 54 may further store device type information.

The bus system 55 may include a power bus, a control bus, a status signal bus, and the like in addition to a data bus. However, for clear description, various types of buses in the figure are marked as the bus system 55.

In an implementation process, the steps of the foregoing method may be completed by using a hardware integrated logic circuit in the processor 53 or an instruction in a form of software. The steps of the positioning method disclosed with reference to the embodiments of the present invention may be directly performed and completed by a hardware processor, or performed and completed by a combination of hardware and software modules in the processor. The software module may be located in a mature storage medium in the art, such as a random memory, a flash memory, a read-only memory, a programmable read-only memory or an electrically erasable programmable memory, or a register. The storage medium is located in the memory 54, and the processor 53 reads information in the memory 54 and completes the steps in the foregoing methods in combination with hardware of the processor. To avoid repetition, details are not described herein again.

The base station 50 according to this embodiment of the present invention may be corresponding to a first base station in a positioning method in a mobile network according to an embodiment of the present invention, and the foregoing and other operations and/or functions of modules in the base station 50 are respectively intended to implement corresponding processes of the methods in FIG. 2, FIG. 3, and FIG. 5 to FIG. 9. For brevity, details are not described herein again.

Therefore, the base station in this embodiment of the present invention is provided with the RTK reference source, determines the correction information according to the RTK measurement value, and sends the correction information to the mobile terminal, so that the mobile terminal obtains high-precision positioning information according to the correction information, thereby meeting requirements of a large quantity of mobile users for high-precision positioning. In addition, the base station is flexible and convenient, and is easy to implement.

Figure 22:
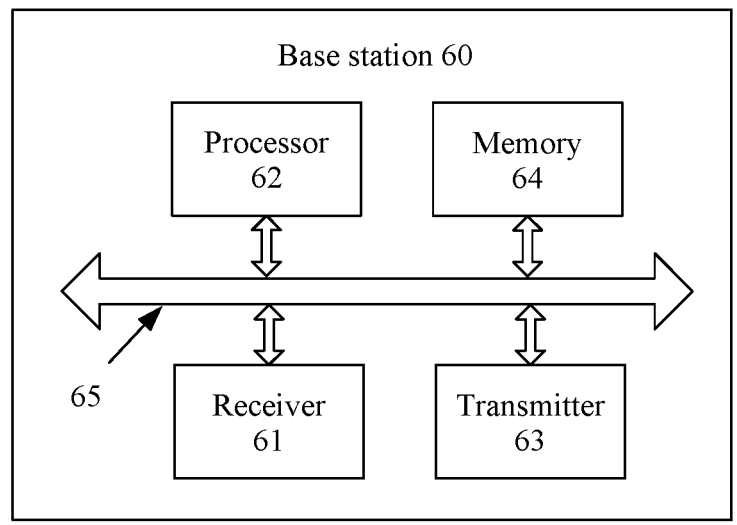
FIG. 22 is a schematic block diagram of another base station according to another embodiment of the present invention.

FIG. 22 shows a schematic block diagram of another base station 60 according to another embodiment of the present invention. As shown in FIG. 22, the base station 60 includes a receiver 61, a processor 62, a transmitter 63, a memory 64, and a bus system 65. The receiver 61, the processor 62, the transmitter 63, and the memory 64 are connected by using the bus system 65. The memory 64 is configured to store an instruction. The processor 62 is configured to execute the instruction stored in the memory 64, to control the receiver 61 to receive a signal and control the transmitter 63 to send a signal.

The receiver 61 is configured to receive a real-time kinematic RTK measurement value for an RTK reference source.

The transmitter 63 is configured to send the RTK measurement value to a server.

The receiver 61 is further configured to receive first correction information sent by the server, where the first correction information is determined by the server according to the RTK measurement value.

The transmitter 63 is further configured to send the first correction information to a first mobile terminal, so that the first mobile terminal corrects, according to the first correction information, positioning information obtained by the first mobile terminal from a positioning system, so as to determine a location of the first mobile terminal.

Therefore, according to the base station in this embodiment of the present invention, the server determines the correction information according to the RTK measurement value sent by the base station, and forwards the correction information to the mobile terminal by using the base station, so that the mobile terminal obtains high-precision positioning information according to the correction information, thereby meeting requirements of a large quantity of mobile users for high-precision positioning and reducing workload of the base station.

Figure 23:
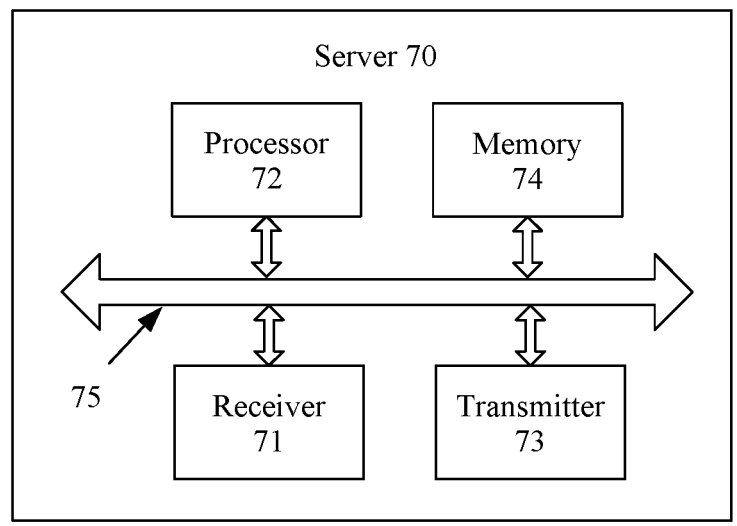
FIG. 23 is a schematic block diagram of a server according to another embodiment of the present invention.

FIG. 23 shows a schematic block diagram of a server 70 according to another embodiment of the present invention. As shown in FIG. 23, the server 70 includes a receiver 71, a processor 72, a transmitter 73, a memory 74, and a bus system 75. The receiver 71, the processor 72, the transmitter 73, and the memory 74 are connected by using the bus system 75. The memory 74 is configured to store an instruction. The processor 72 is configured to execute the instruction stored in the memory 74, to control the receiver 71 to receive a signal and control the transmitter 73 to send a signal.

The receiver 71 is configured to receive a real-time kinematic RTK measurement value that is for an RTK reference source and sent by a first base station.

The processor 72 is configured to determine first correction information according to the RTK measurement value.

The transmitter 73 is configured to send the first correction information to the first base station, so that the first base station forwards the first correction information to a first mobile terminal, so that the first mobile terminal corrects, according to the first correction information, positioning information obtained by the first mobile terminal from a positioning system, so as to determine a location of the first mobile terminal.

Optionally, the first correction information includes a single-reference-station differential correction parameter.

The processor 72 is specifically configured to determine the single-reference-station differential correction parameter according to the RTK measurement value.

The transmitter 73 is specifically configured to send the single-reference-station differential correction parameter to the first base station, so that the first base station forwards the single-reference-station differential correction parameter to the first mobile terminal, so that the first mobile terminal corrects, according to the single-reference-station differential correction parameter, the positioning information obtained by the first mobile terminal from the positioning system, so as to determine the location of the first mobile terminal.

Optionally, the processor 72 is further configured to determine second correction information according to the RTK measurement value.

The transmitter 73 is further configured to send the second correction information to a second base station, so that the second base station forwards the second correction information to a second mobile terminal, so that the second mobile terminal corrects, according to the second correction information, positioning information obtained by the second mobile terminal from the positioning system, so as to determine a location of the second mobile terminal.

Optionally, a distance between the second base station and the first base station falls within a preset range, and the second correction information includes a single-reference-station differential correction parameter.

The transmitter 73 is specifically configured to send the single-reference-station differential correction parameter to the second base station, so that the second base station forwards the single-reference-station differential correction parameter to the second mobile terminal, so that the second mobile terminal corrects, according to the single-reference-station differential correction parameter, the positioning information obtained by the second mobile terminal from the positioning system, so as to determine the location of the second mobile terminal.

Optionally, the second correction information includes a virtual reference station VRS differential correction parameter.

The processor 72 is further configured to: determine, according to a location of the second base station, at least two target first base stations nearest the second base station, and determine the VRS differential correction parameter according to at least two RTK measurement values sent by the at least two target first base stations, where each RTK measurement value is corresponding to one target first base station on which the RTK reference source is installed.

The transmitter 73 is specifically configured to send the VRS differential correction parameter to the second base station, so that the second base station forwards the VRS differential correction parameter to the second mobile terminal, so that the second mobile terminal corrects, according to the VRS differential correction parameter, the positioning information obtained by the second mobile terminal from the positioning system, so as to determine the location of the second mobile terminal.

Optionally, the second correction information includes a MAC unit differential correction parameter.

The processor 72 is further configured to: determine, according to a location of the second base station, a target MAC unit to which the second base station belongs, and determine the MAC unit differential correction parameter according to at least two RTK measurement values sent by at least two target first base stations in the target MAC unit, where each RTK measurement value is corresponding to one target first base station on which the RTK reference source is installed.

The transmitter 73 is specifically configured to send the MAC unit differential correction parameter to the second base station, so that the second base station forwards the MAC unit differential correction parameter to the second mobile terminal, so that the second mobile terminal corrects, according to the MAC unit differential correction parameter, the positioning information obtained by the second mobile terminal from the positioning system, so as to determine the location of the second mobile terminal.

The server 70 according to this embodiment of the present invention may be corresponding to a server in a positioning method in a mobile network according to an embodiment of the present invention, and the foregoing and other operations and/or functions of modules in the server 70 are respectively intended to implement corresponding processes of the methods in FIG. 2 to FIG. 14. For brevity, details are not described herein again.

Therefore, the server in this embodiment of the present invention determines correction information for different base stations according to the RTK measurement value sent by the first base station, and send the correction information to the base stations respectively, and the base stations send the correction information to mobile terminals, so that the mobile terminals obtain high-precision positioning information according to the correction information, thereby meeting requirements of a large quantity of mobile users for high-precision positioning. The server is flexible and convenient, and is easy to implement. In addition, the correction information for the first base station and the correction information for the second base station are both managed by the server, which facilitates management.

Figure 24:
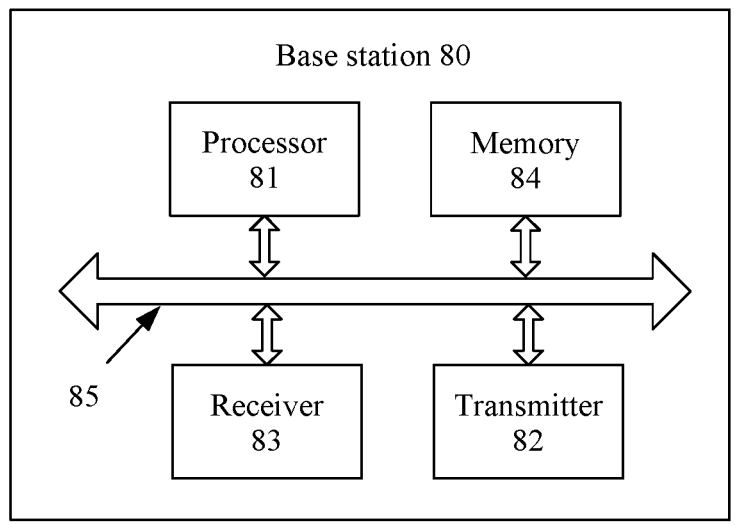
FIG. 24 is a schematic block diagram of still another base station according to another embodiment of the present invention.

FIG. 24 shows a schematic block diagram of still another base station 80 according to another embodiment of the present invention. No real-time kinematic RTK reference source is installed on the base station 80. As shown in FIG. 24, the base station 80 includes a processor 81, a transmitter 82, a receiver 83, a memory 84, and a bus system 85. The processor 81, the transmitter 82, the receiver 83, and the memory 84 are connected by using the bus system 85. The memory 84 is configured to store an instruction. The processor 81 is configured to execute the instruction stored in the memory 84, to control the receiver 83 to receive a signal and control the transmitter 82 to send a signal.

The processor 81 is configured to obtain second correction information, where the second correction information is determined according to an RTK measurement value for an RTK reference source installed on a first base station.

The transmitter 82 is configured to send the second correction information to a second mobile terminal, so that the second mobile terminal corrects, according to the second correction information, positioning information obtained by the second mobile terminal from a positioning system, so as to determine a location of the second mobile terminal.

Optionally, the receiver 83 is specifically configured to receive the RTK measurement value that is sent by the first base station and forwarded by using N forward base stations, where N is determined according to a time-to-live value of the RTK measurement value, and the RTK reference source is not installed on the forward base stations.

Optionally, a distance between the base station 80 and the first base station falls within a preset range, and the second correction information includes a single-reference-station differential correction parameter.

The transmitter 82 is specifically configured to send the single-reference-station differential correction parameter to the second mobile terminal, so that the second mobile terminal corrects, according to the single-reference-station differential correction parameter, the positioning information obtained by the second mobile terminal from the positioning system, so as to determine the location of the second mobile terminal.

Optionally, the second correction information includes a virtual reference station VRS differential correction parameter.

The receiver 83 is specifically configured to receive at least two RTK measurement values sent by at least two first base stations, where each RTK measurement value is corresponding to one first base station on which the RTK reference source is installed.

The processor 81 is specifically configured to determine the VRS differential correction parameter according to the at least two RTK measurement values received by the receiver 83.

The transmitter 82 is specifically configured to send the VRS differential correction parameter to the second mobile terminal, so that the second mobile terminal corrects, according to the VRS differential correction parameter, the positioning information obtained by the second mobile terminal from the positioning system, so as to determine the location of the second mobile terminal.

Optionally, the second correction information includes a master-auxiliary concept MAC unit differential correction parameter.

The receiver 83 is specifically configured to receive at least two target RTK measurement values sent by at least two target first base stations, where the base station 80 and the at least two target first base stations belong to a same target MAC unit, and each RTK measurement value is corresponding to one target first base station on which the RTK reference source is installed.

The processor 81 is specifically configured to determine the MAC unit differential correction parameter according to the target RTK measurement values.

The transmitter 82 is specifically configured to send the MAC unit differential correction parameter to the second mobile terminal, so that the second mobile terminal corrects, according to the MAC unit differential correction parameter, the positioning information obtained by the second mobile terminal from the positioning system, so as to determine the location of the second mobile terminal.

Optionally, the receiver 83 is specifically configured to receive the second correction information sent by the server, where the second correction information is determined by the server according to the RTK measurement value sent by the first base station.

Optionally, the transmitter 82 is specifically configured to send a cell broadcast message, where the cell broadcast message carries the second correction information, so that the second mobile terminal corrects, according to the second correction information, the positioning information obtained by the second mobile terminal from the positioning system, so as to determine the location of the second mobile terminal.

Optionally, the cell broadcast message includes a second system information block SIB message.

The base station 80 according to this embodiment of the present invention may be corresponding to a second base station in a positioning method in a mobile network according to an embodiment of the present invention, and the foregoing and other operations and/or functions of modules in the base station 80 are respectively intended to implement corresponding processes of the methods in FIG. 6 to FIG. 10, and FIG. 12 to FIG. 15. For brevity, details are not described herein again.

Therefore, the base station in this embodiment of the present invention receives the RTK measurement value from the first base station, and determines the second correction information, or receives the second correction information from the server, and sends the second correction information to the second mobile terminal, so that the second mobile terminal determines high-precision positioning information according to the second correction information, thereby meeting requirements of a large quantity of mobile users for high-precision positioning and reducing construction costs of the first base station. In addition, the base station is flexible and convenient, and is easy to implement.

Figure 25:
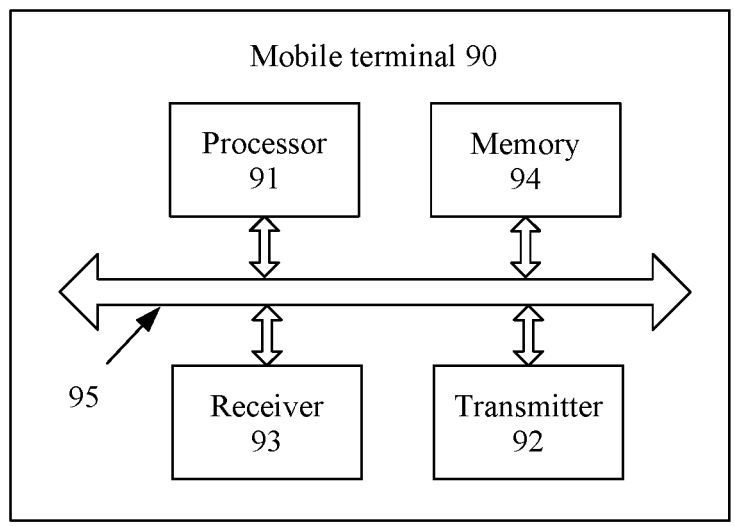
FIG. 25 is a schematic block diagram of a mobile terminal according to another embodiment of the present invention.

FIG. 25 shows a schematic block diagram of a mobile terminal 90 according to another embodiment of the present invention. As shown in FIG. 25, the mobile terminal 90 includes a processor 91, a transmitter 92, a receiver 93, a memory 94, and a bus system 95. The processor 91, the transmitter 92, the receiver 93, and the memory 94 are connected by using the bus system 95. The memory 94 is configured to store an instruction. The processor 91 is configured to execute the instruction stored in the memory 94, to control the receiver 93 to receive a signal and control the transmitter 92 to send a signal.

The processor 91 is configured to obtain positioning information for the mobile terminal 90 from a positioning system.

The receiver 93 is configured to receive correction information sent by a base station, where the correction information is determined according to a real-time kinematic RTK measurement value.

The processor 91 is further configured to correct, according to the correction information received by the receiver 93, the positioning information obtained by the processor 91, so as to determine a location of the mobile terminal.

The mobile terminal 90 according to this embodiment of the present invention may be corresponding to a mobile terminal in a positioning method in a mobile network according to an embodiment of the present invention, and the foregoing and other operations and/or functions of modules in the mobile terminal 90 are respectively intended to implement corresponding processes of the methods in FIG. 2 to FIG. 15. For brevity, details are not described herein again.

Therefore, the mobile terminal in this embodiment of the present invention receives the correction information from the base station, and corrects the positioning information obtained from the positioning system, so as to determine high-precision positioning information for the mobile terminal, thereby meeting requirements of a large quantity of mobile users for high-precision positioning.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A positioning method in a mobile network, comprising:
receiving, by a second base station, one or multiple first real-time kinematic (RTK) measurement value sent by one or multiple first base station, wherein the RTK measurement value is an RTK measurement value of the first base station for a real-time kinematic RTK reference source, the second base station has no RTK reference source installed and the first RTK measurement value carries location information of the first base station;
calculating, by the second base station, second correction information of the second base station according to the one first RTK measurement value, if a distance between the second base station and the first base station falls within a preset range, wherein the second correction information is correction information for positioning information obtained by the RTK reference source from a positioning system, and the second correction information is correction information of the second base station;
calculating, by the second base station, the second correction information of the base station according to the multiple first RTK measurement values, if a distance between the second base station and the first base station falls outside a preset range; and sending, by the second base station, the second correction information to a second mobile terminal, so that the second mobile terminal corrects, according to the second correction information, positioning information obtained by the second mobile terminal from the positioning system, so as to determine a location of the second mobile terminal.

2. The positioning method according to claim 1, wherein the receiving, by a second base station, a first RTK measurement value sent by a first base station comprises:

receiving, by the second base station by using N forward base stations for forwarding, the first RTK measurement value sent by the first base station, wherein N is determined according to a time-to-live value of the RTK measurement value.

3. A positioning method in a mobile network, wherein the positioning method comprises:

receiving, by a server, one or multiple first RTK measurement value sent by one or multiple first base station, wherein the first RTK measurement value is an RTK measurement value of the first base station for a real-time kinematic RTK reference source, the second base station has no RTK reference source installed and the first RTK measurement value carries location information of the first base station;

calculating, by the server, second correction information of a second base station according to the one first RTK measurement value, if a distance between the second base station and the first base station falls within a preset range, wherein the second correction information is correction information for positioning information obtained by the RTK reference source from a positioning system, and the second correction information is correction information of the second base station;

calculating, by the server, second correction information of a second base station according to the multiple first RTK measurement values of multiple first base stations, if a distance between the second base station and the first base station falls outside a preset range; and sending the second correction information to the second base station, so that the second base station sends the second correction information to a second mobile terminal, so that the second mobile terminal corrects, according to the second correction information, positioning information obtained by the second mobile terminal from the positioning system, so as to determine a location of the second mobile terminal, wherein the second correction information is determined by the server according to the RTK measurement value.

4. A positioning base station in a mobile network, wherein the base station comprises a receiver, a processor, and a transmitter; wherein the receiver is configured to receive one or multiple first RTK measurement value sent by one or multiple first base station, wherein the RTK measurement value is an RTK measurement value for a real-time kinematic RTK reference source, and the RTK measurement value is an RTK measurement value of the first base station, the second base station has no RTK reference source installed and the first RTK measurement value carries location information of the first base station;

the processor is configured to calculate second correction information according to the one first RTK measurement value, if a distance between the second base station and the first base station falls within a preset range, wherein the second correction information is correction information for positioning information obtained by the RTK reference source from a positioning system;

the processor is further configured to calculate the second correction information of the base station according to the multiple first RTK measurement values, if a distance between the second base station and the first base station falls outside a preset range; and the transmitter is configured to send the second correction information to a second mobile terminal, so that the second mobile terminal corrects, according to the second correction information, positioning information obtained by the second mobile terminal from the positioning system, so as to determine a location of the second mobile terminal.

5. The base station according to claim 4, wherein the measurement value receiving module is specifically configured to receive the first RTK measurement value by using a forward base station, the first RTK measurement value is forwarded by using N forward base stations, and N is determined according to a time-to-live value of the RTK measurement value.

6. A positioning server in a mobile network, wherein the positioning server comprises a receiver, a processor, and a transmitter; wherein the receiver is configured to receive one or multiple first RTK measurement value sent by one or multiple first base station, wherein the RTK measurement value is an RTK measurement value for a real-time kinematic RTK reference source, and the RTK measurement value is an RTK measurement value of the first base station, the second base station has no RTK reference source installed and the first RTK measurement value carries location information of the first base station;

the processor is configured to calculate second correction information of a second base station according to the one first RTK measurement value, if a distance between the second base station and the first base station falls within a preset range, wherein the second correction information is correction information for positioning information obtained by the RTK reference source from a positioning system, and the second correction information is correction information of the second base station;

the processor is further configured to calculate the second correction information of the base station according to the multiple first RTK measurement values, if a distance between the second base station and the first base station falls outside a preset range; and the transmitter is configured to send the second correction information to the second base station, so that the second base station sends the second correction information to a second mobile terminal, so that the second mobile terminal corrects, according to the second correction information, positioning information obtained by the second mobile terminal from the positioning system, so as to determine a location of the second mobile terminal, wherein the second correction information is determined by the server according to the RTK measurement value.

* * * * *